(12) United States Patent
Chang et al.

(10) Patent No.: US 10,001,847 B2
(45) Date of Patent: Jun. 19, 2018

(54) TOUCH CONTROL APPARATUS FOR DETECTING TILT ANGLE AND AXIAL DIRECTION OF STYLUS AND CONTROL METHOD THEREOF

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 7 days.

(21) Appl. No.: 15/452,847

(22) Filed: Mar. 8, 2017

(65) Prior Publication Data

US 2017/0262122 A1    Sep. 14, 2017

Related U.S. Application Data

(60) Provisional application No. 62/305,045, filed on Mar. 8, 2016, provisional application No. 62/334,668, filed on May 11, 2016.

(51) Int. Cl.
*G06F 3/044* (2006.01)
*G06F 3/038* (2013.01)
*G06F 3/0354* (2013.01)
*G06F 3/041* (2006.01)

(52) U.S. Cl.
CPC ............ *G06F 3/0383* (2013.01); *G06F 3/038* (2013.01); *G06F 3/03545* (2013.01); *G06F 3/044* (2013.01); *G06F 3/0416* (2013.01); *G06F 2203/04108* (2013.01)

(58) Field of Classification Search
CPC .. G06F 3/03545; G06F 3/046; G06F 3/03543; G06F 3/044
USPC ..................... 345/179–183; 178/19.01–19.07
See application file for complete search history.

(56) References Cited

U.S. PATENT DOCUMENTS

| 5,798,756 | A * | 8/1998 | Yoshida | G06F 3/0412 178/20.02 |
| 8,766,954 | B2 * | 7/2014 | Vuppu | G06F 3/044 178/19.03 |
| 9,746,944 | B2 * | 8/2017 | Gur | G06F 3/03545 |
| 9,864,441 | B2 * | 1/2018 | Geller | G06F 3/03545 |
| 9,898,105 | B2 * | 2/2018 | Ogata | G06F 3/03545 |
| 2004/0095333 | A1 * | 5/2004 | Morag | G06F 3/03545 345/173 |
| 2012/0019488 | A1 * | 1/2012 | McCarthy | G06F 3/03545 345/179 |

(Continued)

*Primary Examiner* — Chad Dicke
(74) *Attorney, Agent, or Firm* — WPAT, PC

(57) ABSTRACT

The present invention provides a touch control apparatus capable of detecting a tilt angle and an axial direction of a stylus, wherein the stylus includes a first electrode at a tip of the stylus, a second electrode surrounding the first electrode. and a first button; the touch control apparatus comprising: a sensing circuit connected to a touch screen; a signal strength detecting circuit; and a processing module connected to the sensing circuit and the signal strength detection circuit, the processing module being configured for determining the status of the first button based on the modulation sequence; and determining the tilt angle and the axial direction of the stylus based on the electrical signals of a plurality of time periods.

19 Claims, 15 Drawing Sheets

|  | No button pressed | Eraser button pressed | Barrel button pressed |
|---|---|---|---|
| 1st modulation sequence 701 | 601 | 602 | 603 |
|  | 602 | 601 | 602 |
|  | 603 | 603 | 601 |
| 2nd modulation sequence 702 | 602 | 603 | 601 |
|  | 601 | 602 | 602 |
|  | 603 | 601 | 603 |
| 3rd modulation sequence 703 | 603 | 601 | 602 |
|  | 602 | 602 | 601 |
|  | 601 | 603 | 603 |

(56) References Cited

U.S. PATENT DOCUMENTS

| | | | | |
|---|---|---|---|---|
| 2014/0002422 A1* | 1/2014 | Stern | ................... | G06F 3/03545 345/179 |
| 2014/0022218 A1* | 1/2014 | Parekh | ................... | G06F 3/038 345/179 |
| 2014/0146021 A1* | 5/2014 | Trethewey | ........... | G06F 3/0488 345/179 |
| 2014/0184554 A1* | 7/2014 | Walley | ................. | G06F 3/0416 345/174 |
| 2014/0375573 A1* | 12/2014 | Idzik | ................... | G06F 3/0383 345/173 |
| 2015/0077403 A1* | 3/2015 | Bell | ................... | G06F 3/03545 345/179 |
| 2015/0123923 A1* | 5/2015 | Stern | ................... | G06F 3/0418 345/173 |
| 2017/0068339 A1* | 3/2017 | Zimmerman | ......... | G06F 3/0383 |
| 2017/0192591 A1* | 7/2017 | Jang | ....................... | G06F 3/0416 |
| 2017/0242502 A1* | 8/2017 | Gray | ................... | G06F 3/03545 |
| 2017/0285772 A1* | 10/2017 | Yamamoto | ............ | G06F 3/0383 |
| 2018/0024658 A1* | 1/2018 | Yamamoto | .......... | G06F 3/03545 345/179 |
| 2018/0024674 A1* | 1/2018 | Leigh | ................. | G06F 3/03545 345/173 |
| 2018/0081454 A1* | 3/2018 | Nakabayashi | ...... | G06F 3/03545 |

\* cited by examiner

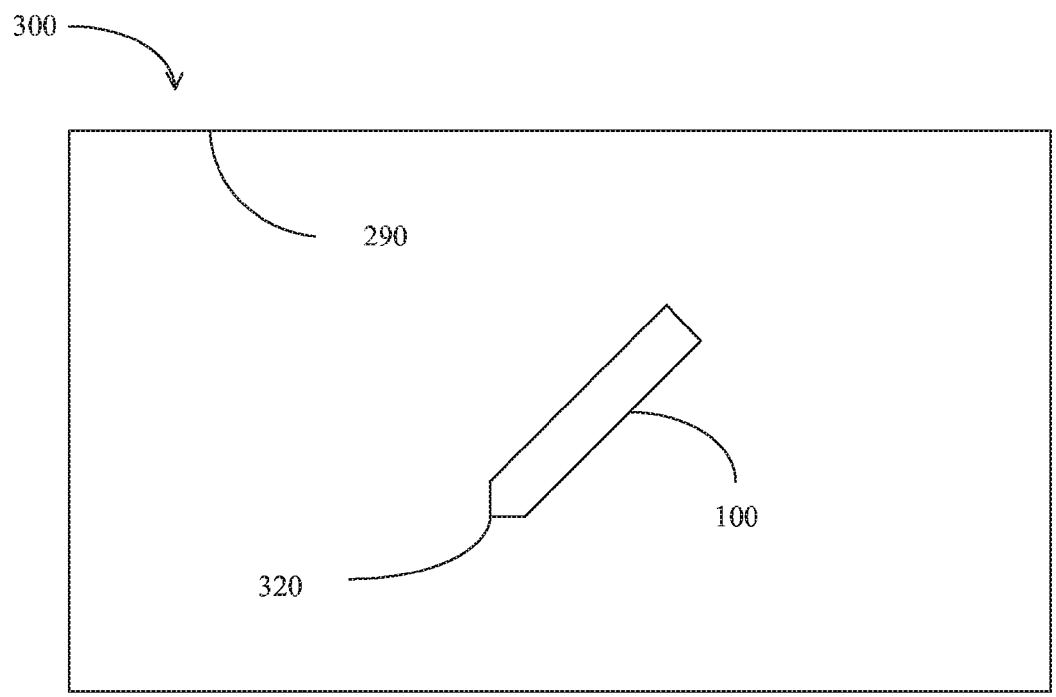
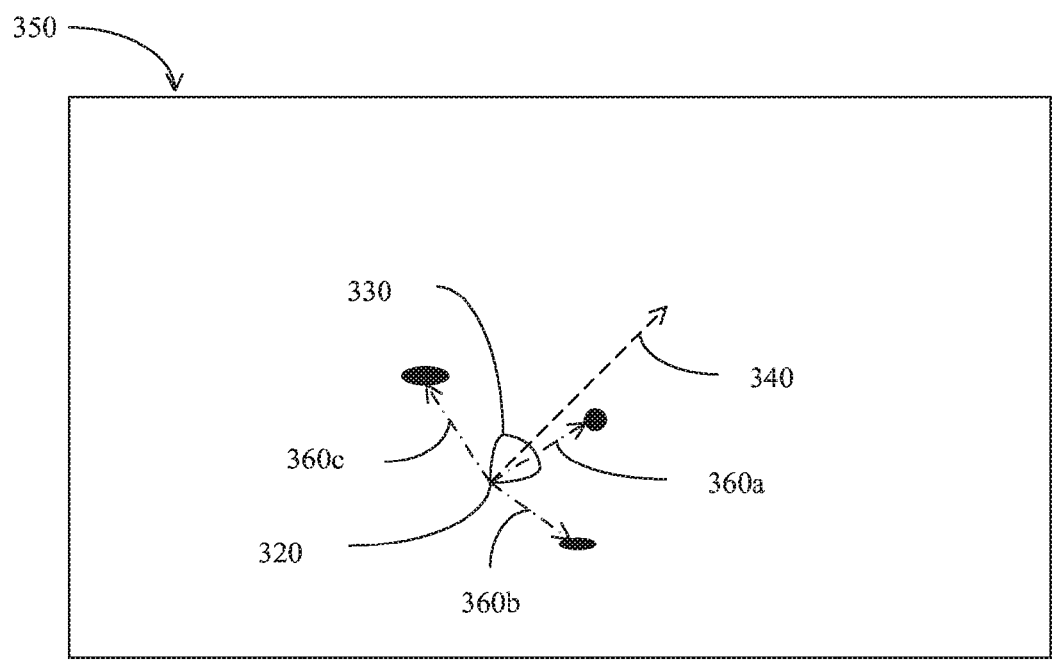
FIG. 3

| FIG. 6 | Signal from 1st electrode? | Signal from 2nd electrode | Signal Strength |
|---|---|---|---|
| 1st modulation 601 (Using 1st electrode only) | Yes | No | weakest |
| 2nd modulation 602 (Using 2nd electrode only) | No | Yes | Medium |
| 3rd modulation 603 (Using both 1st and 2nd electrodes) | Yes | Yes | Strongest |

| FIG. 7 | | No button pressed | Eraser button pressed | Barrel button pressed |
|---|---|---|---|---|
| 1st modulation sequence 701 | | 601 | 602 | 603 |
| | | 602 | 601 | 602 |
| | | 603 | 603 | 601 |
| 2nd modulation sequence 702 | | 602 | 603 | 601 |
| | | 601 | 602 | 602 |
| | | 603 | 601 | 603 |
| 3rd modulation sequence 703 | | 603 | 601 | 602 |
| | | 602 | 602 | 601 |
| | | 601 | 603 | 603 |

| FIG. 20 | Signal from 1st electrode | Signal from 2nd electrode | Signal Strength |
|---|---|---|---|
| 1st modulation 601 (Using 1st electrode only) | Yes | No | Weakest |
| 2nd modulation 602 (Using 2nd electrode only) | No | Yes | Medium |
| 3rd modulation 603 (Using both 1st and 2nd electrodes) | Yes | Yes | Strongest |
| 4th modulation 604 | No | No | None |

| FIG. 21 | No button pressed | Eraser button pressed | Barrel button pressed | Two buttons pressed |
|---|---|---|---|---|
| 1st modulation sequence 2101 | 601 | 601 | 601 | 604 |
| | 604 | 602 | 602 | 601 |
| | 601 | 604 | 603 | 602 |
| | 602 | 603 | 604 | 603 |
| 2nd modulation sequence 2102 | 602 | 602 | 602 | 604 |
| | 604 | 603 | 603 | 602 |
| | 603 | 604 | 601 | 603 |
| | 601 | 601 | 604 | 601 |

TOUCH CONTROL APPARATUS FOR DETECTING TILT ANGLE AND AXIAL DIRECTION OF STYLUS AND CONTROL METHOD THEREOF

CROSS REFERENCE TO RELATED APPLICATIONS

This application claims priority under 35 U.S.C 119 to U.S. provisional patent application 62/305,045, filed on Mar. 8, 2016, and to U.S. provisional patent application, 62/334,668, filed on May 11, 2016, the disclosures of which are incorporated herein by reference.

BACKGROUND OF THE INVENTION

1. Field of the Invention

The present invention is related to a stylus, and more specifically, a stylus providing a tilt angle and an axial direction.

2. Description of the Prior Art

Touch panels or screens (hereinafter the term "touch screens" is used to represent both the touch screens and the touch panels) have become one of the major input/output devices for modern electronic systems. In order to achieve more accurate manipulation experiences, stylus is used in lieu of fingers as the touch control medium. In addition, stylus that actively emits signals have better manipulation accuracy than passive stylus that does not actively emit signals since it allows touch screens to obtain signals with better signal to noise ratios.

If an electronic system is capable of detecting the pointing direction of the axis (axial direction) and/or a tilt angle of an active stylus with respect to a touch screen, it is able to provide more control options to a user using the active stylus, as well as more input selections and convenience. Therefore, there is a need for a structure of an active stylus and a method for controlling electrical signals of an active stylus, and a method for detecting the active stylus in order to detect not only a location of the active stylus with respect to a touch screen, but also the axial direction and/or the tilt angle of the active stylus with respect to the touch screen.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

The present invention provides a stylus for providing a tilt angle and an axial direction of a stylus body, including: a first electrode at a tip of the stylus; a second electrode surrounding the first electrode, wherein the first electrode and the second electrode are not electrically coupled; and a control module connected to the first electrode and the second electrode, wherein the control module is configured to have the first electrode emitting a first-time-period electrical signal and the second electrode coupled to a direct current voltage during a first time period, the control module is further configured to have the first electrode emitting a second-time-period electrical signal and the second electrode floated during a second time period.

The present invention provides a control method for providing a tilt angle and an axial direction of a stylus body, the stylus including a first electrode at a tip of the stylus and a second electrode surrounding the first electrode, wherein the first electrode and the second electrode are not electrically coupled, the control method comprising: during a first time period, having the first electrode emitting a first-time-period electrical signal and the second electrode connecting to a direct current voltage; and during a second time period, having the first electrode emitting a second-time-period electrical signal and the second electrode floated.

The present invention provides a touch control apparatus capable of detecting a tilt angle and an axial direction of a stylus, comprising: a sensing circuit connected to a touch screen, wherein the touch screen includes a plurality of first touch sensitive electrodes and a plurality of second touch sensitive electrodes, the plurality of first touch sensitive electrodes and the plurality of second touch sensitive electrodes intersecting to form a plurality of sensing points; and a processing module connected to the sensing circuit, the processing module instructing the sensing circuit to detect a first-time-period electrical signal emitted by a first electrode of the stylus during a first time period, and instructing the sensing circuit to detect a second-time-period electrical signal emitted by the first electrode and a second electrode of the stylus during a second time period, and determining the tilt angle and the axial direction of the stylus based on detection results of the first and second time periods, wherein the second electrode surrounds the first electrode, the first electrode and the second electrode are not electrically coupled.

The present invention provides a control method capable of detecting a tilt angle and an axial direction of a stylus, comprising: instructing a sensing circuit to detect a first-time-period electrical signal emitted by a first electrode of the stylus via a touch screen during a first time period; instructing the sensing circuit to detect a second-time-period electrical signal emitted by the first electrode and a second electrode of the stylus via the touch screen during a second time period; and determining the tilt angle and the axial direction of the stylus based on the detection results of the first time period and the second time period, wherein the second electrode surrounds the first electrode, and the first electrode and the second electrode are not electrically coupled.

The present invention provides a touch sensitive system capable of detecting a tilt angle and an axial direction of a stylus body, comprising: a stylus including: a first electrode at a tip of the stylus and a second electrode surrounding the first electrode, wherein the first electrode and the second electrode are not electrically coupled; and a control module configured to have the first electrode emitting a first-time-period electrical signal and the second electrode coupled to a direct current voltage during a first time period, and to have the first electrode emitting a second-time-period electrical signal and the second electrode floated during a second time period; a touch screen including a plurality of first touch sensitive electrodes and a plurality of second touch sensitive electrodes, the plurality of first touch sensitive electrodes and the plurality of second touch sensitive electrodes intersecting to form a plurality of sensing points; and a touch control apparatus including: a sensing circuit connected to the touch screen; and a processing module connected to the sensing circuit for instructing the sensing circuit to detect the first-time-period electrical signal emitted by the first electrode of the stylus during the first time period, and instructing the sensing circuit to detect the second-time-period electrical signal emitted by the first electrode and the second electrode of the stylus during the second time period, and determining the tilt angle and the axial direction of the stylus based on detection results of the first and second time periods.

The present invention provides a stylus for providing a tilt angle and an axial direction of a stylus body, including: a first electrode at a tip of the stylus; a third electrode surrounding the first electrode; a second electrode surrounding the third electrode, wherein the first electrode, the second electrode and the third electrode are not electrically coupled, the third electrode is connected to ground potential for shielding the first and the second electrodes; and a control module connected to the first electrode and the second electrode, wherein the control module is configured to have the first electrode emitting a first-time-period electrical signal during a first time period, and to have the first and the second electrodes emitting a second-time-period electrical signal during a second time period.

The present invention provides a control method for providing a tilt angle and an axial direction of a stylus, wherein the stylus includes a first electrode as a stylus tip, a third electrode surrounding the first electrode, and a second electrode surrounding the third electrode, wherein the first electrode, the second electrode and the third electrode are not electrically coupled, the third electrode is connected to ground potential for shielding the first and second electrodes, the control method comprising: having the first electrode emitting a first-time-period electrical signal during a first time period; and having the first electrode and the second electrode emitting a second-time-period electrical signal during a second time period.

The present invention provides a touch sensitive system capable of detecting a tilt angle and an axial direction of a stylus, comprising: the stylus including: a first electrode at a tip of the stylus; a third electrode surrounding the first electrode; and a second electrode surrounding the third electrode, wherein the first electrode, the second electrode and the third electrode are not electrically coupled, the third electrode is connected to ground potential for shielding the first and second electrodes; and a control module connected to the first and the second electrodes, wherein the control module instructs the first electrode to emit a first-time-period electrical signal during a first time period and instructs the first electrode and the second electrode to emit a second-time-period electrical signal during a second time period; a touch screen including a plurality of first touch sensitive electrodes and a plurality of second touch sensitive electrodes, the plurality of first touch sensitive electrodes and the plurality of second touch sensitive electrodes forming a plurality of sensing points; and a touch control apparatus including: a sensing circuit connected to the touch screen; and a processing module connected to the sensing circuit for instructing the sensing circuit to detect the first-time-period electrical signal emitted by the first electrode of the stylus during the first time period, and instructing the sensing circuit to detect the second-time-period electrical signal emitted by the first electrode and a second electrode of the stylus during the second time period, and based on detection results of the first and second time periods, determining the tilt angle and the axial direction of the stylus.

The present invention provides a stylus for providing a tilt angle and an axial direction of a stylus body, including: a first electrode at a tip of the stylus; a second electrode surrounding the first electrode; a third electrode surrounding the second electrode, wherein the first electrode and the third electrode are not electrically coupled, the second electrode and the third electrode are not electrically coupled; and a control module connected to the first electrode, the second electrode and the third electrode, wherein the control module is configured to have the first electrode and the second electrode emitting a first-time-period electrical signal and the third electrode connecting to a direct current voltage during a first time period, and to have the first and the second electrodes emitting a second-time-period electrical signal and the third electrode floating during a second time period.

The present invention provides a control method for providing a tilt angle and an axial direction of a stylus, wherein the stylus includes a first electrode at a tip of the stylus, a second electrode surrounding the first electrode; and a third electrode surrounding the second electrode, wherein the first electrode and the third electrode are not electrically coupled, the second electrode and the third electrode are not electrically coupled; the control method comprising: having the first electrode and the second electrode emitting a first-time-period electrical signal and the third electrode connecting to a direct current voltage during a first time period; and having the first and the second electrodes emitting a second-time-period electrical signal and the third electrode floating during a second time period.

The present invention provides a touch sensitive system capable of detecting a tilt angle and an axial direction of a stylus, comprising: the stylus including: a first electrode at a tip of the stylus; a second electrode surrounding the first electrode; a third electrode surrounding the second electrode, wherein the first electrode and the third electrode are not electrically coupled, the second electrode and the third electrode are not electrically coupled; and a control module connected to the first electrode, the second electrode and the third electrode, wherein the control module is configured to have the first electrode and the second electrode emitting a first-time-period electrical signal and the third electrode connecting to a direct current voltage during a first time period, and to have the first and the second electrodes emitting a second-time-period electrical signal and the third electrode floating during a second time period; a touch screen including a plurality of first touch sensitive electrodes and a plurality of second touch sensitive electrodes, the plurality of first touch sensitive electrodes and the plurality of second touch sensitive electrodes forming a plurality of sensing points; and a touch control apparatus including: a sensing circuit connected to the touch screen; and a processing module connected to the sensing circuit for instructing the sensing circuit to detect the first-time-period electrical signal emitted by the stylus during the first time period, and instructing the sensing circuit to detect the second-time-period electrical signal emitted by the stylus during the second time period, and based on detection results of the first and second time periods, determining the tilt angle and the axial direction of the stylus.

The present invention provides a stylus for providing a tilt angle and an axial direction of a stylus body comprising: a first electrode at a tip of the stylus; a second electrode surrounding the first electrode; a first button; and a control module connected to the first and the second electrodes and the button, wherein the control module is configured for instructing the first electrode and the second electrode to each perform one of a plurality of modulations in each of a plurality of time periods based on the status of the first button, wherein the plurality of modulations include the following three types: instructing the first electrode to emit an electrical signal; instructing the second electrode to emit an electrical signal; and instructing both the first and the second electrodes to emit electrical signals simultaneously.

The present invention provides a control method for providing a tilt angle and an axial direction of a stylus, wherein a first electrode at a tip of the stylus, a second electrode surrounding the first electrode, and a first button; the control method comprising: reading the status of first button; and instructing the first electrode and the second electrode to each perform one of a plurality of modulations in each of a plurality of time periods based on the status of the first button, wherein the plurality of modulations include the following three types: instructing the first electrode to emit an electrical signal; instructing the second electrode to emit an electrical signal; and instructing both the first and the second electrodes to emit electrical signals simultaneously.

The present invention provides a touch control apparatus capable of detecting a tilt angle and an axial direction of a stylus, wherein the stylus includes a first electrode at a tip of the stylus, a second electrode surrounding the first electrode, and a first button; the touch control apparatus comprising: a sensing circuit connected to a touch screen, wherein the touch screen includes a plurality of first touch sensitive electrodes and a plurality of second touch sensitive electrodes, the plurality of first touch sensitive electrodes and the plurality of second touch sensitive electrodes forming a plurality of sensing points; a signal strength detecting circuit; and a processing module connected to the sensing circuit and the signal strength detection circuit, the processing module being configured for: instructing the sensing circuit to receive electrical signals emitted by the stylus in a plurality of time periods; instructing the signal strength detecting circuit to calculate magnitudes of signal strengths of the electrical signals in the plurality of time periods to determine a modulation sequence used by the stylus, wherein the modulation sequence includes a plurality of modulations, each of the time periods uses one type of the plurality of modulations; determining the status of the first button based on the modulation sequence; and determining the tilt angle and the axial direction of the stylus based on the electrical signals of the plurality of time periods, wherein the plurality of modulations include the following three types: instructing the first electrode to emit an electrical signal; instructing the second electrode to emit an electrical signal; and instructing both the first and the second electrodes to emit electrical signals simultaneously.

The present invention provides a control method for providing a tilt angle and an axial direction of a stylus, wherein the stylus includes a first electrode at a tip of the stylus, a second electrode surrounding the first electrode and a first button, the control method comprising: instructing a sensing circuit to receive via a touch screen electrical signals emitted by the stylus in a plurality of time periods; instructing a signal strength detecting circuit to calculate magnitudes of signal strengths of the electrical signals in the plurality of time periods to determine a modulation sequence used by the stylus, wherein the modulation sequence includes a plurality of modulations, each of the time periods uses one type of the plurality of modulations; determining the status of the first button based on the modulation sequence; and determining the tilt angle and the axial direction of the stylus based on the electrical signals of the plurality of time periods, wherein the plurality of modulations include the following three types: instructing the first electrode to emit an electrical signal; instructing the second electrode to emit an electrical signal; and instructing both the first and the second electrodes to emit electrical signals simultaneously.

The present invention provides a touch sensitive system capable of detecting a tilt angle and an axial direction of a stylus, comprising: the stylus including: a first electrode at a tip of the stylus; a second electrode surrounding the first electrode; and a first button; a touch screen including a plurality of first touch sensitive electrodes and a plurality of second touch sensitive electrodes, the plurality of first touch sensitive electrodes and the plurality of second touch sensitive electrodes forming a plurality of sensing points; and a touch control apparatus connected with the touch screen including: a sensing circuit connected with the touch screen; a signal strength detecting circuit; and a processing module connected to the sensing circuit and the signal strength detection circuit, the processing module being configured for: instructing the sensing circuit to receive electrical signals emitted by the stylus in a plurality of time periods; instructing the signal strength detecting circuit to calculate magnitudes of signal strengths of the electrical signals in the plurality of time periods to determine a modulation sequence used by the stylus, wherein the modulation sequence includes a plurality of modulations, each of the time periods uses one type of the plurality of modulations; determining the status of the first button based on the modulation sequence; and determining the tilt angle and the axial direction of the stylus based on the electrical signals of the plurality of time periods, wherein the plurality of modulations include the following three types: instructing the first electrode to emit an electrical signal; instructing the second electrode to emit an electrical signal; and instructing both the first and the second electrodes to emit electrical signals simultaneously.

Based on the aforementioned embodiments, the present invention discloses various structures and control methods of electrical signals of active stylus, and detection methods of the corresponding active stylus, so that in addition to detecting the location of an active stylus with respect to a touch screen, the axial direction and/or tilt angle of the active stylus with respect to the touch screen can also be detected. In some embodiments, the status of a button belonging to the active stylus and the pressure experienced at the tip of the active stylus can also be detected. In accordance with the embodiments of the present invention, more information about the stylus can be provided to an application, such that the application can provide better user experience based on the information, and providing more control functions relating to the stylus to the user.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein:

FIG. 3 are schematic diagrams illustrating detection of an axial direction of a stylus by a touch controller based on two-dimensional (2D) sensing information or an image in accordance with embodiments of the present invention.

FIG. 6 is a modulation table for a first electrode and a second electrode emitting electrical signals in accordance with an embodiment of the present invention.

FIG. 7 is a schematic diagram illustrating modulation sequences in accordance with an embodiment of the present invention.

FIG. 20 is a table of four modulations in accordance with an embodiment of the present invention.

FIG. 21 is a schematic diagram illustrating modulation sequences in accordance with an embodiment of the present invention.

DETAILED DESCRIPTION OF THE PREFERRED EMBODIMENTS

Figure 1:
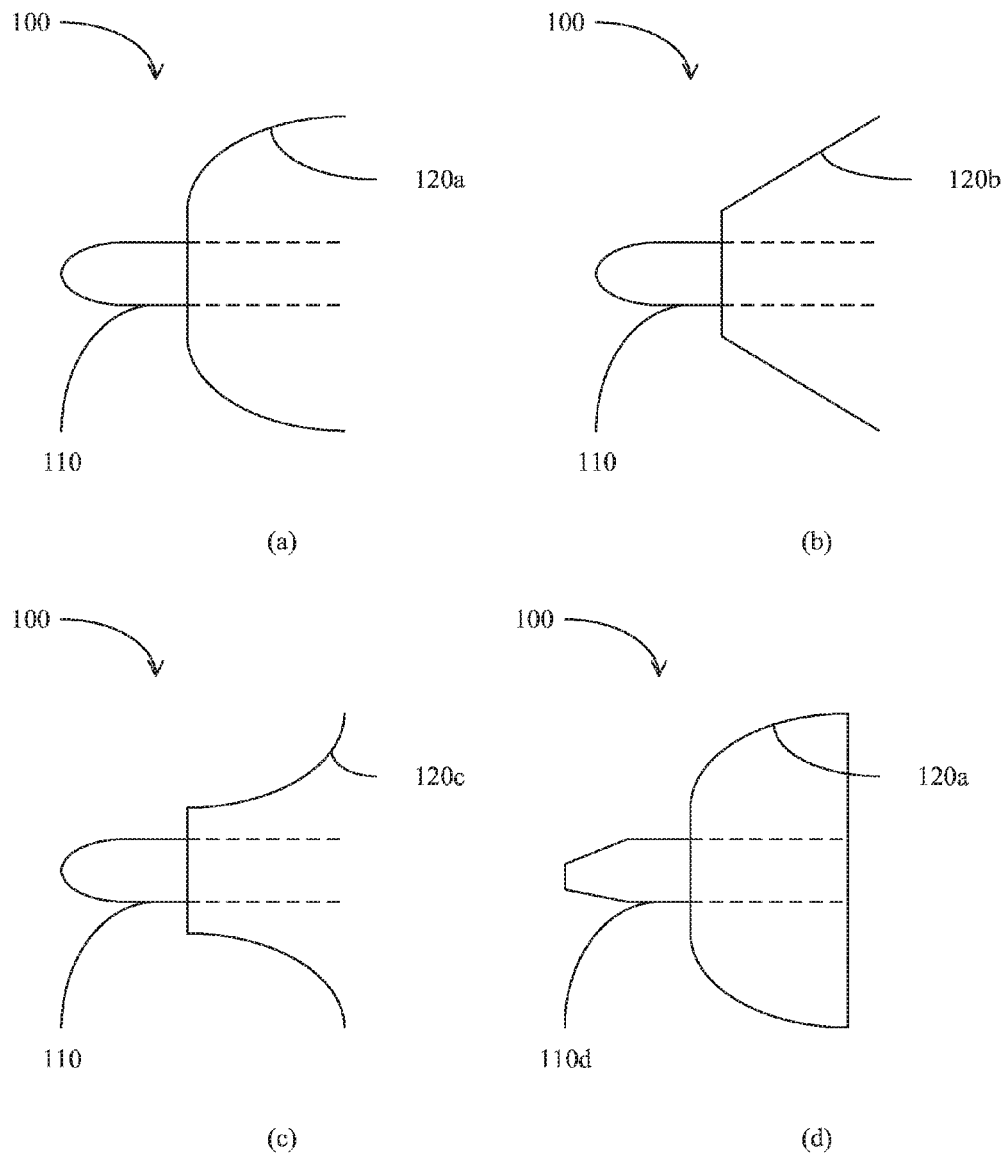
FIG. 1 shows schematic diagrams illustrating stylus with electrodes of four different shapes in accordance with embodiments of the present invention.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

In an embodiment of the present invention, in order to obtain an axial direction and/or a tilt angle of a stylus, a stylus 100 including two adjacent electrodes is provided. As shown in FIG. 1, schematic diagrams illustrating stylus 100 with electrodes of four different shapes in accordance with embodiments of the present invention are provided. In FIG. 1, the tip of the stylus or a first electrode 110 can be a conductor, a conductive rubber, or a bundle of conductive fibers. A second electrode or an annular electrode 120 is provided behind the stylus tip, and it can be a conductor. The second electrode 120 is not connected with the first electrode 110.

The second electrode 120 can be a metal, a metal coating, or other forms of conductor. The second electrode 120 may surround the body of the stylus, or include a plurality of electrodes, which together surround the stylus body. In an embodiment of FIG. 1, the back end of the first electrode 110 is surrounded by the second electrode 120. The second electrode 120 can have various cross-sectional shapes, such as second electrodes 120(a)~120(c) shown in FIGS. 1(a)~(c), respectively. On the axis projection of the stylus 100, the first electrode 110 and the second electrode 120 are adjacent to each other. In the embodiment of FIG. 1(d), the shape of the stylus head of the first electrode 110d is different from those of the other first electrodes 110. The present invention does not limit the cross-sectional shape of the second electrode 120, nor the shape of the stylus head of the first electrode 110.

In an embodiment, when the stylus 100 instructs the first electrode 110 to emit electrical signals, it instructs the second electrode 120 to connect to the ground potential or a particular DC voltage. Similarly, in another embodiment, when the second electrode 120 is instructed to emit electrical signals, the first electrode 110 is instructed to connect to the ground potential. In this way, crosstalk between the first electrode 110 and the second electrode 120 can be prevented. It also avoids the situation where the touch screen senses the electrical signals emitted by the second electrode 120 through the first electrode 110, or to sense the electrical signals emitted by the first electrode 110 through the second electrode 120.

In an embodiment, in a first time period, the stylus 100 instructs the first electrode 110 to emit an electrical signal, while instructing the second electrode 120 to connect to ground potential or a particular direct current (DC) voltage. This avoids mutual induction caused by crosstalk between the first electrode 110 and the second electrode 120, and also prevents the touch screen from sensing the electrical signal emitted by the first electrode 110 via the second electrode 120.

In a second time period, the stylus 100 instructs the first electrode 110 to emit an electrical signal, while instructing the second electrode 120 to float. By doing so, the electrical signal emitted by the first electrode 110 is sensed in the second electrode 120, and crosstalk occurs between the first electrode 110 and the second electrode 120. This allows the touch screen to sense the electrical signal emitted by the first electrode 110 via the second electrode 120.

In this embodiment, the first time period and the second time period can be continuously alternated. The present invention does not limit which period is implemented first, nor which period has longer duration. In other words, the stylus 100 may continuously instruct the first electrode 110 to emit an electrical signal, but alternate the potential of the second electrode 120 by connecting it to ground (or a particular DC voltage) or being floated.

In an embodiment, only the first time period is implemented, and the stylus 100 is just a standard active stylus. In another embodiment, only the second time period is implemented, and the capacitive effect between the stylus 100 and the touch screen can be used for determining the axial direction and/or a tilt angle of the stylus 100.

Figure 2:
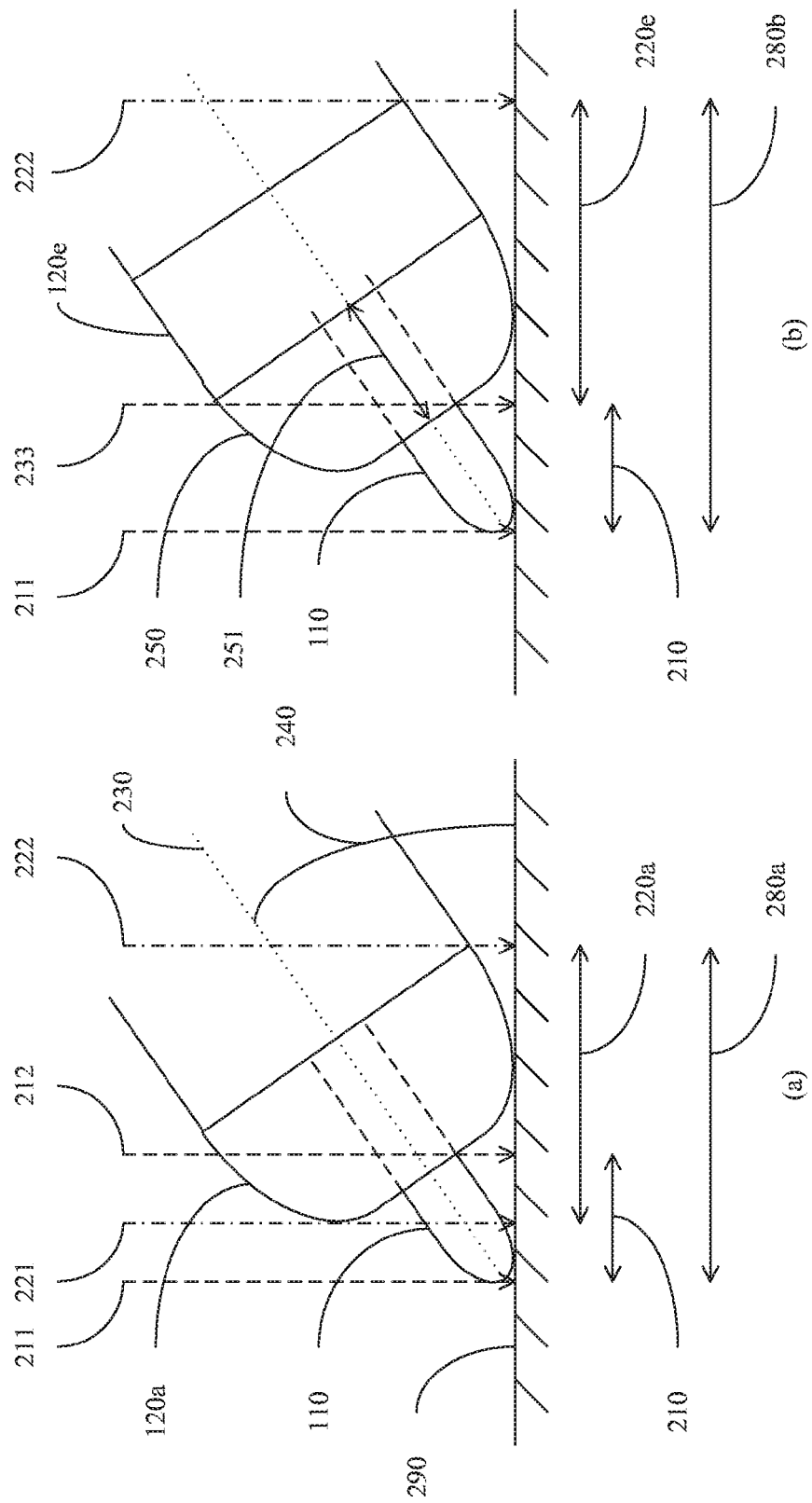
FIG. 2 shows schematic diagrams illustrating stylus at minimum tilt angle in accordance with embodiments of the present invention.

Referring to FIG. 2, schematic diagrams illustrating stylus at minimum tilt angles in accordance with embodiments of the present invention are shown. The embodiments shown in FIG. 2 are used to illustrate the distance limits between the first electrode 110 and the second electrode 120. The first electrode 110 of the stylus 100 is in contact with a touch screen 290. A center axis line 230 of the stylus 100 forms a minimum tilt angle 240 with the touch screen 290. If the angle between the center axis line 230 and the touch screen 290 is smaller than the minimum tilt angle 240, the first electrode 110 of the stylus 100 will not be able to touch the touch screen 290.

The stylus 100 of FIG. 2(*a*) is the embodiment shown in FIG. 1(*a*), but it may be equally applicable to those in FIGS. 1(*b*) to (*d*) and other embodiments.

In FIG. 2(*a*), a projected range of the first electrode 110 on the touch screen 290 is between a first electrode front projected line 211 and a first electrode back projected line 212. In other words, the first electrode 110 projects a first electrode projected line 210 on the touch screen 290. A projected range of the second electrode 120 on the touch screen 290 is between a second electrode front projected line 221 and a second electrode back projected line 222. In other words, the second electrode 120 projects a second electrode projected line 220*a* on the touch screen 290. The first electrode projected line 210 and the second electrode projected line 220*a* are connected, and the union of the two projected lines is a projected line 280*a*.

The difference between FIG. 2(*b*) and FIG. 2(*a*) is in that the first electrode 110 and the second electrode 120*a* of FIG. 2(*a*) are adjacent to each other, whereas the first electrode 110 and a second electrode 120*e* of FIG. 2(*b*) projected on the center axis line 230 of the stylus 100 are not adjacent to each other, but a spacer element 250 is disposed between the two. The spacer element 250 similarly surrounds the first electrode 110, and has a length 251 projected on the center axis line 230.

In FIG. 2(*b*), a projected range of the first electrode 110 on the touch screen 290 is between a first electrode front projected line 211 and a first electrode back projected line 233. The first electrode 110 projects the first electrode projected line 210 on the touch screen 290. A projected range of the second electrode 120 on the touch screen 290 is between a second electrode front projected line 233 and a second electrode back projected line 222. The second electrode 120 projects a second electrode projected line 220*e* on the touch screen 290.

As shown in FIG. 2(*b*), the first electrode back projected line 233 is the second electrode front projected line 233. The first electrode projected line 210 and the second electrode projected line 220*e* are connected, and the union of the two is a projected line 280*b*, but the intersection of the two is the empty set. In other words, when the stylus 100 shown in FIG. 2(*b*) is at the minimum tilt angle, the projected lines of the first electrode 110 and the second electrode 120*e* on the touch screen 290 are connected, but are not overlapping each other. The projections of the first electrode 110 and the second electrode 120*e* along the center axis line 230 is still separated by the distance (or length) 251. According to the embodiment of the present invention, when the angle between the center axis line 230 of the stylus 100 and the touch screen 290 is greater than or equal to the minimum tilt angle, the projected lines of the first electrode 110 and the second electrode 120*e* on the touch screen 290 can be connected. In the above case, the first electrode 110 and the second electrode 120*e* do not have to be in contact with the touch screen 290, the projected lines of the first electrode 110 and the second electrode 120*e* on the touch screen 290 can still be connected.

Referring to FIG. 3, schematic diagrams illustrating detection of an axial direction of the stylus 100 by a touch controller based on two-dimensional (2D) sensing information or an image are shown. FIG. 3(*a*) is a top view of the touch screen 290. The stylus 100 in accordance with an embodiment of the present invention approximates or touches the touch screen 290. The tip of the stylus 100 or the tip of the first electrode 110 is at a tip location 320.

Each electrode of the touch screen 290 is connected to a touch controller (not shown). In some embodiments, the touch screen 290 includes a plurality of parallel first touch sensitive electrodes and a plurality of parallel second touch sensitive electrodes intersecting to form a plurality of sensing points. The touch controller is capable of obtaining 2D sensing information of the plurality of sensing points using various approaches. Each sensing information corresponds to one sensing point. Therefore, these 2D sensing information together may be taken as an image. In some embodiments, the touch controller can be in sync with the stylus 100 in order to obtain 2D sensing information. For example, when the touch controller instructs the first touch sensitive electrodes to send out a driving signal in turn, the stylus 100 will emit an electrical signal actuated by the driving signal received. The electrical signal and the driving signal can be related or not related. If the two signals are related, they may have a certain amount of phase difference.

FIG. 3(*b*) is a schematic diagram illustrating 2D sensing information in accordance with an embodiment of the present invention. Based on the image sensed, the touch controller can therefore derive the tip location 320 (i.e. the first electrode projection area) and/or a second electrode projection area 330. In some embodiments, the touch controller can obtain the tip location 320 after a first scanning of the touch screen 290, the second electrode projection area 330 after a second scanning of the touch screen 290, and/or the tip location 320 and the second electrode projection area 330 after a third scanning of the touch screen 290. If multiple scanning is to be carried out, the touch controller can perform the union of the plurality of images to obtain the image 350 shown in FIG. 3(*b*), which includes the tip location 320 (i.e. the first electrode projection area) and the second electrode projection area 330.

As shown in the embodiments of FIG. 2, as the projected lines of the first electrode 110 and the second electrode 120 are connected, the first electrode projection area 320 and the second electrode projection area 330 will also be connected. The touch controller can calculate a projection vector 340 of the stylus 100 based on a projected axis line of the first electrode projection area 320 and the second electrode projection area 330. The touch controller can calculate or lookup (from a lookup table) the tilt angle of the stylus 100 based on the position of the center of gravity, the shape, the center position, the area or other characteristics of the second electrode projection area 330 as well as the tip location 320.

It should be noted that, in the image 350 of FIG. 3(*b*), there are black dots representing noise. The tip location 320 may form false stylus body vectors 360a to 360c with these noise signals. However, as these dots are not connected with the tip location 320, the touch controller is able to determine that these signals are noise and the stylus body vectors 360a to 360c formed with the tip location 320 are false. Without the projection relationship of the first electrode 110 and the second electrode 120 at the minimum tilt angle shown in FIG. 2, the touch controller would not be able to eliminate the false body vectors 360a to 360c in the image 350 and their corresponding noise signals.

Figure 4:
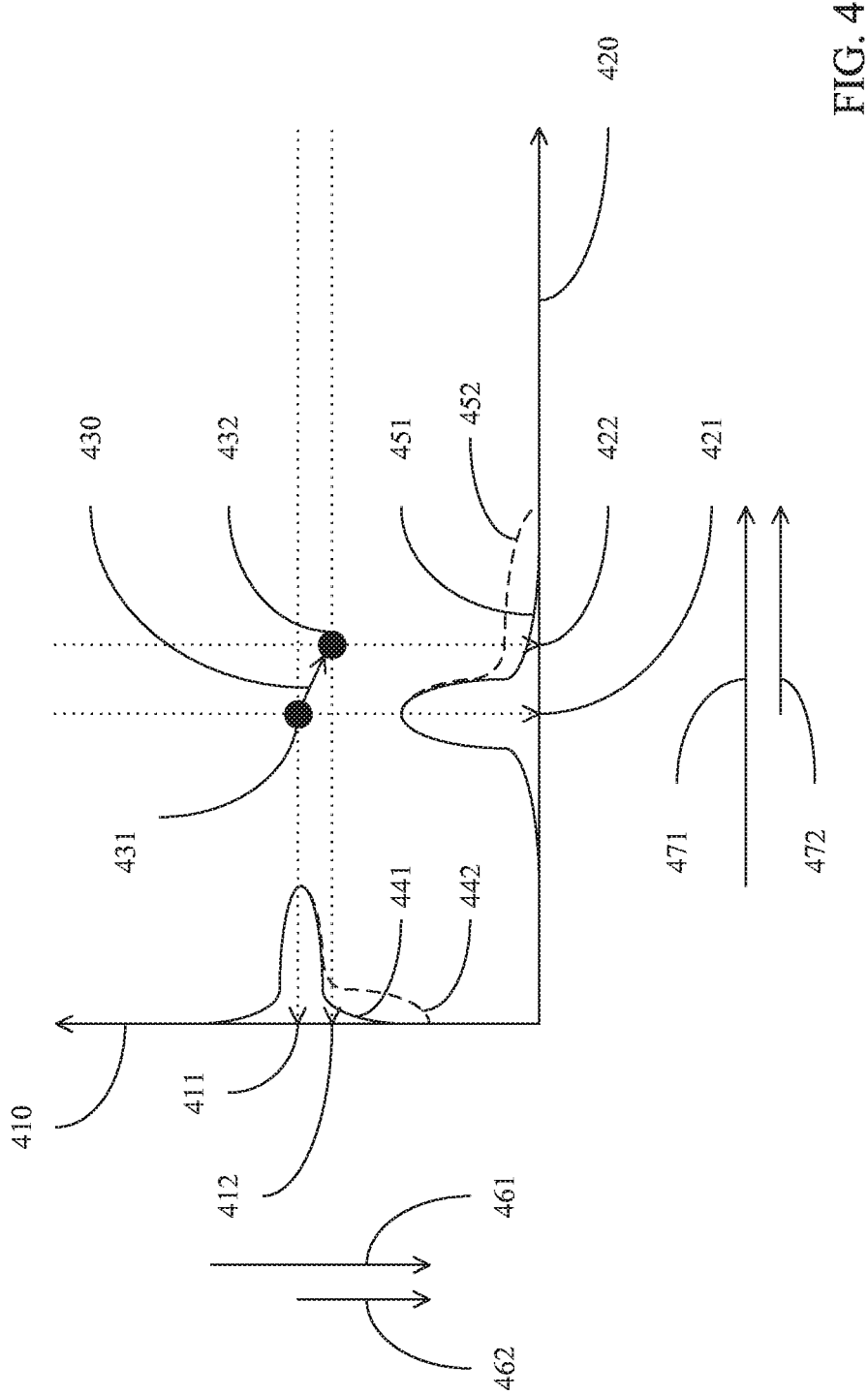
FIG. 4 is a schematic diagram illustrating detection of an axial direction of a stylus by a touch controller based on 1D sensing information in two axial directions in accordance with an embodiment of the present invention.

Referring to FIG. 4, a schematic diagram illustrating detection of an axial direction of the stylus 100 by the touch controller based on 1D sensing information in two axial directions in accordance with an embodiment of the present invention is shown. Different from the touch controller in the embodiment of FIG. 3, the touch controller of FIG. 4 detects an electrical signal of the stylus 100 using all first touch sensitive electrodes parallel to a second axis 420, the result of which is 1D sensing information 441 or 442; the touch controller also detects an electrical signal of the stylus 100 using all second touch sensitive electrodes parallel to a first axis 410, the result of which is 1D sensing information 451 or 452. It can be seen that the detection results of FIG. 4 provides two lines (1D sensing information) corresponding to the first axis 410 and the second axis 420, instead of an image or 2D sensing information shown in FIG. 3(b) above.

When the first electrode 110 of the stylus 100 emits an electrical signal, 1D sensing information 441 and 451 are obtained by the touch controller. Based on valid signals within the 1D sensing information 441 and 451, the touch controller is able to obtain a first axis tip coordinate 411 on the first axis 410 and a second axis tip coordinate 421 on the second axis 420. The first axis tip coordinate 411 and the second axis tip coordinate 421 indicate the tip location or a first location 431.

When both the first electrode 110 and the second electrode 120 of the stylus 100 send out electrical signals at the same time, 1D sensing information 442 and 452 are obtained by the touch controller. Based on valid signals within the 1D sensing information 442 and 452, the touch controller is able to obtain a first axis tip coordinate 412 on the first axis 410 and a second axis tip coordinate 422 on the second axis 420. The first axis tip coordinate 412 and the second axis tip coordinate 422 indicate a second location 432.

In an embodiment, based on a stylus body vector 430 formed from the first location 431 and the second location 432, an axial direction of a stylus body can be known. Furthermore, based on the length of the stylus body vector 430, the tilt angle of the stylus 100 can be calculated or looked up. From another perspective, the stylus body vector 430 is composed of a component of the first axis (i.e. the difference between the coordinates 411 and 412) and a component of the second axis (i.e. the difference between the coordinates 421 and 422). In other embodiments, the difference between the coordinates 411 and 412 and the difference between the coordinates 421 and 422 are not used to calculate the stylus body vector 430 and the tilt angle.

In another embodiment, a range of the valid signals of the 1D sensing information 441 on the first axis 410 is a first vector 461, and a range of the valid signals of the 1D sensing information 451 on the second axis 420 is a second vector 471. The first vector 461 and the second vector 471 can be used to calculate the stylus body vector 430 and the tilt angle.

In yet another embodiment, the starting point of the first vector 461 can be set to the first axis tip coordinate 411 in order to form a third vector 462, and the starting point of the second vector 471 can be set to the second axis tip coordinate 421 in order to form a fourth vector 472. The third vector 462 and the fourth vector 472 can be used to calculate the stylus body vector 430 and the tilt angle.

In an embodiment, the location of the center of gravity for the 1D sensing information 441 and the location of the center of gravity for the 1D sensing information 451 are calculated as the starting points for a fifth vector and a sixth vector, respectively. Then, the location of the center of gravity for the 1D sensing information 442 and the location of the center of gravity for the 1D sensing information 452 are calculated as the end points for the fifth vector and the sixth vector, respectively. The stylus body vector 430 and the tilt angle can then be calculated based on the fifth vector and the sixth vector.

Figure 5:
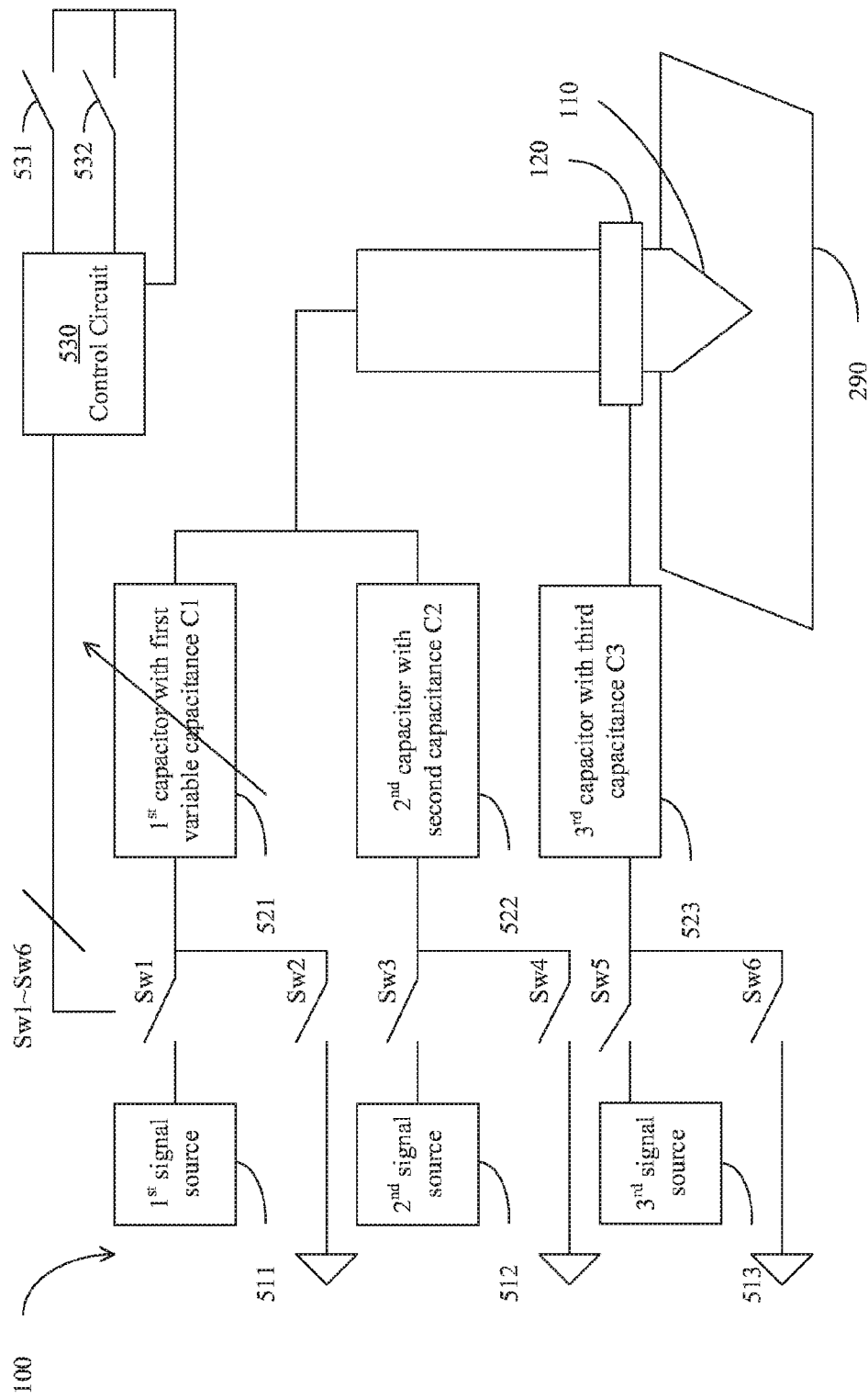
FIG. 5 is a block diagram illustrating a stylus in accordance with an embodiment of the present invention.

Referring to FIG. 5, a block diagram illustrating the stylus 100 in accordance with an embodiment of the present invention is shown. Most aspects of FIG. 5 are the same as those described with respect to FIG. 5 of TW Patent Application No. 103138889 and relevant U.S. Patent Application No. 2015/0,153,845. Reference is made to descriptions of FIG. 5 of these applications and various relevant embodiments.

The difference between FIG. 5 of the present invention and FIG. 5 of Application '889 is in that the stylus 100 includes more than one buttons, such as a button 531 and/or a button 532. The two buttons 531 and 532 may correspond to a barrel button and an eraser button, respectively. The two buttons 531 and 532 are connected to a control circuit 530. The control circuit 530 controls the close or open of switches Sw1 to Sw6 through various control lines.

In Application '889, detailed explanations have been made as to how the switches Sw1 and Sw2 are used for controlling the connection of the first electrode 110 to a first signal source 511 or the ground potential via a first capacitor 521; switches Sw3 and Sw4 for controlling the connection of the first electrode 110 to a second signal source 521 or the ground potential via a second capacitor 522; and switches Sw5 and Sw6 for controlling the connection of the second electrode 120 to a third signal source 531 or the ground potential via a third capacitor 523.

In accordance with the embodiment in Application '889, the touch controller can obtain the pressure experienced at the tip of the stylus 100 by receiving and analyzing an electrical signal from the first electrode 110, details of which will not be further illustrated herein.

In an embodiment, the control circuit 530 can be an active element, such as a microprocessor or an embedded processor. It controls the above switches Sw1 to Sw6 via a software or a firmware. In another embodiment, the control circuit 530 can be a logic circuit for controlling the above switches Sw1 to Sw6 based on the statuses of the button 531 and/or the button 532 without using a software. Reference is now made to embodiments of FIGS. 6 and 7 for timing of the opening/closing of the switches Sw1 to Sw6, i.e. the design of the above software or the logic circuit.

Referring to FIG. 6, a modulation table for the first electrode 110 and the second electrode 120 emitting electrical signals in accordance with an embodiment of the present invention is shown. Since there are two electrodes available for emitting signals, there can be four modulations. However, not including the case when neither of the electrodes emits any signal, there are only three modulations. The first modulation 601 involves the first electrode 110 emitting an electrical signal and the second electrode 120 emitting no signal. The second modulation 602 involves the second electrode 120 emitting an electrical signal and the first electrode 110 emitting no signal. The third modulation 603 involves the first electrode 110 and the second electrode 120 simultaneously emitting electrical signals. Since the projection area of the first electrode 110 is relatively smaller, the total signal strengths sensed by a touch sensor in these three modulations are, when ranked from the strongest to the weakest, the third modulation 603, the second modulation 602 and the first modulation 601.

The first modulation 601 allows the touch controller to find the tip location 320 such as that shown in FIG. 3(*a*) or 1D sensing information 441 and 451 such as those shown in FIG. 4 so as to find the tip location 431. In addition to determining the tip location, as shown in the embodiment with respect to FIG. 5, an electrical signal emitted by the first electrode 110 includes signals from the first signal source 511 and the second signal source 521. The touch controller can obtain the pressure experienced at the tip of the stylus 100 by receiving and analyzing the electrical signal from the first electrode 110.

The second modulation 602 allows the touch controller to find the tip location 320 and the second projection area 330, such as those shown in FIG. 3(*a*), and two 1D sensing information in the embodiment of FIG. 4. The touch controller can determine the pointing direction of the body and the tilt angle of the stylus based merely on the shape of the second projection area 330.

The third modulation 603 allows the touch controller to find the tip location 320 and the second projection area 330, and 1D sensing information 442 and 452, such as those shown in FIG. 4.

In an embodiment, the touch controller is able to obtain the tip location, the pressure at the tip, the axial direction of a stylus body and the tilt angle of the stylus through the first modulation 601 and the third modulation 603. In another embodiment, the touch controller is able to obtain the tip location, the axial direction of a stylus body and the tilt angle of the stylus through the second modulation 602 and the third modulation 603. In yet another embodiment, the touch controller is able to obtain the tip location, the pressure at the tip, the axial direction of a stylus body and the tilt angle of the stylus through the first modulation 601 and the second modulation 602. Therefore, based on two or more modulations, the touch controller can at least determine the tip location, the axial direction of a stylus body and the tilt angle of the stylus. If the first modulation 601 is included, the pressure at the tip of the stylus can also be determined. When the tip of the stylus is not under pressure, i.e. the stylus 100 is suspended above the touch screen 290, only two modulations are needed to obtain the tip location, the pressure at the tip, the axial direction of a stylus body and the tilt angle of the stylus. In other words, if these three modulations 601 to 603 are respectively provided in three periods T1, T2 and T3, then the touch controller must be able to obtain the tip location, the pressure at the tip, the axial direction of a stylus body and the tilt angle of the stylus.

Now the explanations are given on how the touch controller determines the statues of the buttons 531 and 532. Referring to FIG. 7, a modulation sequence table in accordance with an embodiment of the present invention is shown. When no buttons are pressed, a sequence 701 of three periods of an embodiment 701 would be allocated to the respective transmissions of the modulations 601, 602 and 603 in the order given. Upon receiving the signals in the three periods, the touch controller first determines the strengths of the signals received in these three periods, which in this case are weakest, medium, and strongest, respectively, implying that the modulation 601 is sent first, then the modulation 602 and finally the modulation 603. Based on the embodiment 701, the touch controller would know that this particular order of the modulations means no buttons on the stylus are pressed. Moreover, based on some or all of these modulations, the tip location, the pressure at the tip, the axial direction of a stylus body and the tilt angle of the stylus can also be obtained. In other words, the touch controller obtains the statuses of the buttons and the tip location, the pressure at the tip, the axial direction of a stylus body and the tilt angle of the stylus.

Similarly, in the embodiment corresponding to a sequence 701, if the strengths of the signals received in the three periods are medium, weakest and strongest, respectively, then the touch controller would know the modulations transmitted are in the order of 602, 601 and 603, which indicates that the eraser button is pressed. Accordingly, based on some or all of these modulations, the touch controller obtains the statuses of the buttons and the tip location, the pressure at the tip, the axial direction of a stylus body and the tilt angle of the stylus.

Similarly, in the embodiment corresponding to a sequence 701, if the strengths of the signals received in the three periods are strongest, medium and weakest, respectively, then the touch controller would know the modulations transmitted are in the order of 603, 602 and 601, which indicates that the barrel button is pressed. Accordingly, based on some or all of these modulations, the touch controller obtains the statuses of the buttons and the tip location, the pressure at the tip, the axial direction of a stylus body and the tilt angle of the stylus.

One with ordinary skill in the art can appreciate that sequences 702 and 703 shown in FIG. 7 are merely two other alternatives to the embodiment 701, there can be more embodiments with different sequences from which the touch controller obtains the statuses of the buttons and the tip location, the pressure at the tip, the axial direction of a stylus body and the tilt angle of the stylus.

One with ordinary skill in the art can also appreciate that in the case that the stylus 100 has only one button, only two periods are required for transmitting two modulations. For example, when the button is not pressed, the first modulation 601 is used in the first period and the third modulation 603 is used in the second period; when the button is pressed, the third modulation 603 is used in the first period and the first modulation 601 is used in the second period. Alternatively, when the button is pressed, the first modulation 601 is used in the first period and the third modulation 603 is used in the second period; when the button is not pressed, the third modulation 603 is used in the first period and the first modulation 601 is used in the second period.

From another perspective, the design of the control circuit 530 shown in FIG. 5 can be implemented according to one of the embodiments shown in FIG. 7.

In another embodiment of the present invention, a time-division multiplexing modulation scheme can be used to control the first electrode 110 and the second electrode 120, so that the touch controller can identify the axial direction of the body of the stylus 100. The time-division multiplexing modulation scheme includes two time periods, but the present invention does not limit the order of these two periods.

In the first period, the first electrode 110 is made to transmit an electrical signal, and the second electrode 120 is grounded. As such, the second electrode 120 will impose a shielding effect on the first electrode 110 it is surrounding. The touch controller obtains the tip location (the first electrode projection area) in the first period.

In the second period, the first electrode 110 is made to transmit an electrical signal, and the second electrode 120 is floated. The second electrode 120 will sense the electrical signal of the first electrode 110 it is surrounding, which has an influence on the second electrode projection area on the touch screen. The touch controller obtains the tip location (the first electrode projection area) and the second electrode projection area in the second period.

Similar to the embodiments with respect to FIGS. 3 and 4, regardless of using 2D sensing information (an image) or two 1D sensing information, the touch controller is able to calculate or lookup the axial direction of a stylus body and the tilt angle based on the tip location (the first electrode projection area) and the second electrode projection area.

It should be noted that, in this embodiment, the first electrode 110 and the second electrode 120 do not necessarily have the constraint shown in FIG. 2(b), that is, at the minimum tilt angle, the first electrode projection area and the second electrode projection area can be separated (not connected). Although under this situation, noise may cause false stylus body vectors to be determined, such as the false stylus body vectors 360 (a) to (c) in FIG. 3(b).

Figure 8:
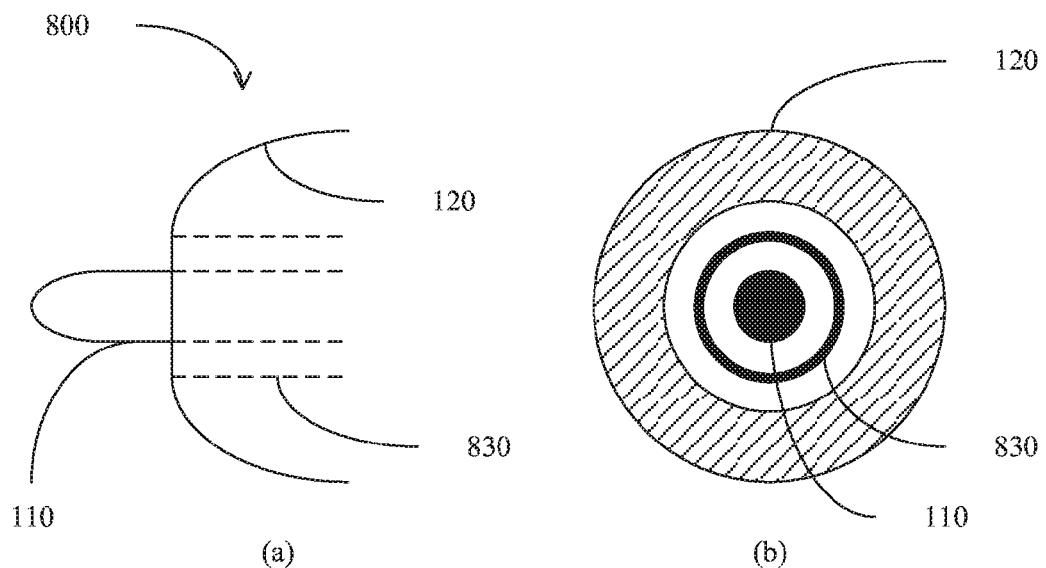
FIG. 8 shows a cross-sectional view and a front view of a head section of a stylus in accordance with an embodiment of the present invention.

Referring to FIG. 8, a cross-sectional view and a front view of a head section of a stylus 800 in accordance with an embodiment of the present invention are shown. The difference between the stylus 800 shown in FIG. 8 and the stylus 100 shown in FIG. 1(a) is in that a third electrode 830 connected to the ground potential is further interposed between the first electrode 110 and the second electrode 120. The third electrode 830 is used for shielding the first electrode 110 and the second electrode 120 to prevent crosstalk. The third electrode 830 may assume various different shapes, and the present invention is not limited to the shape shown as long as it can shield the first electrode 110 and the second electrode 120.

Equally applicable to the embodiment shown in FIG. 8, the present invention may adopt a time-division multiplexing modulation scheme to control the first electrode 110 and the second electrode 120, so that the touch controller can identify the axial direction of the body of the stylus 800. The time-division multiplexing modulation scheme includes two time periods, but the present invention does not limit the order of these two periods.

In the first period, the first electrode 110 is made to transmit an electrical signal, and the second electrode 120 is in a "don't care" condition, i.e. the second electrode 120 can be connected to the ground or floated. As such, the third electrode 830 will impose a shielding effect on the first electrode 110 it is surrounding. The touch controller obtains the tip location (the first electrode projection area) in the first period.

In the second period, the first electrode 110 is made to transmit an electrical signal, and the second electrode 120 is also made to transmit an electrical signal simultaneously. The touch controller obtains the tip location (the first electrode projection area) and the second electrode projection area in the second period.

Similar to the embodiments with respect to FIGS. 3 and 4, regardless of using 2D sensing information (an image) or two 1D sensing information, the touch controller is able to calculate or lookup the axial direction of a stylus body and the tilt angle based on the tip location (the first electrode projection area) and the second electrode projection area.

It should be noted that, in this embodiment, the first electrode 110 and the second electrode 120 do not necessarily have the constraint shown in FIG. 2(b), that is, at the minimum tilt angle, the first electrode projection area and the second electrode projection area can be separated (not connected). Although under this situation, noise may cause false stylus body vectors to be determined, such as the false stylus body vectors 360 (a) to (c) in FIG. 3(b).

In addition, in the second period, the electrical signals transmitted by the first electrode 110 and the second electrode 120 can be the same or different. For example, the two signals may have different frequencies, so that the touch controller is able to identify the tip location (the first electrode projection area) and the second electrode projection area based merely on the difference in the signals.

Figure 9:
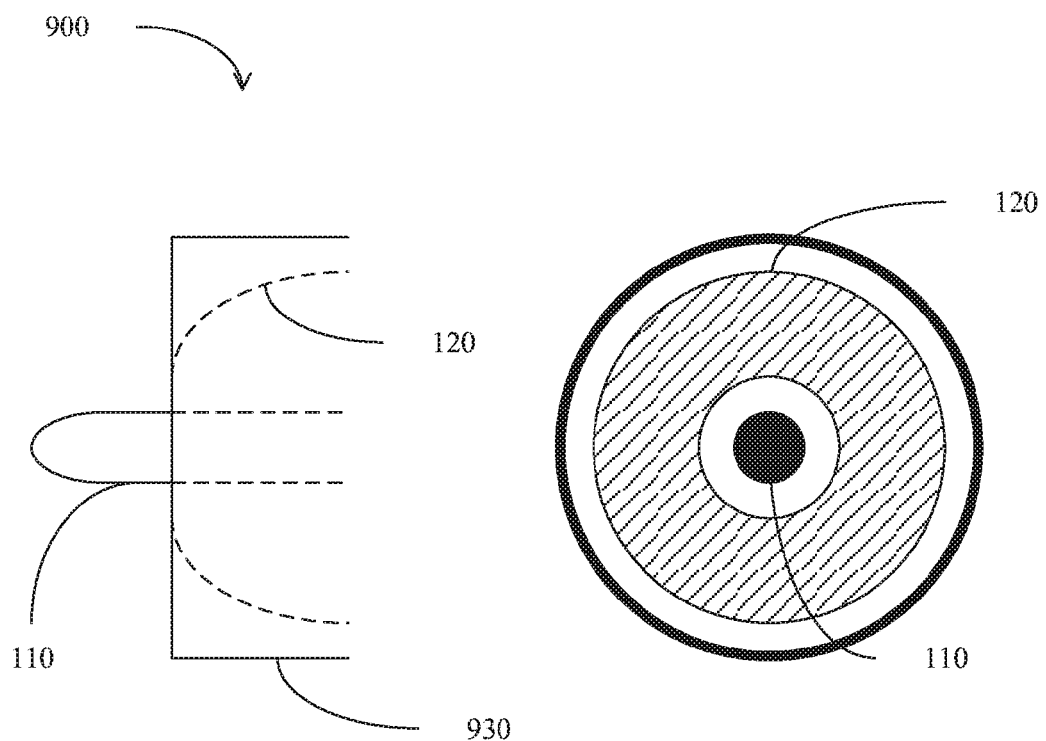
FIG. 9 shows a cross-sectional view and a front view of a head section of a stylus in accordance with an embodiment of the present invention.

Referring to FIG. 9, a cross-sectional view and a front view of a head section of a stylus 900 in accordance with an embodiment of the present invention are shown. The difference between the stylus 900 shown in FIG. 8 and the stylus 100 shown in FIG. 1(a) is in that the stylus 900 includes a third electrode 930 surrounding the second electrode 10. The third electrode 930 is used for shielding the second electrode 120 to prevent crosstalk. The third electrode 930 may assume various different shapes, and the present invention is not limited to that shown as long as it can shield the second electrode 120.

Equally applicable to the embodiment shown in FIG. 9, the present invention may adopt a time-division multiplexing modulation scheme to control the first electrode 110 and the second electrode 120, so that the touch controller can identify the axial direction of the body of the stylus 900. The time-division multiplexing modulation scheme includes two time periods, but the present invention does not limit the order of these two periods.

In the first period, the first electrode 110 is made to transmit an electrical signal, the second electrode 120 is also made to transmit an electrical signal simultaneously, and the third electrode 930 is connected to the ground potential. As such, the third electrode 930 will shield the electrical signal of the second electrode 120 from the touch screen. The touch controller obtains the tip location (the first electrode projection area) in the first period.

In the second period, the first electrode 110 is made to transmit an electrical signal, the second electrode 120 is also made to transmit an electrical signal simultaneously, and the third electrode 930 is made to float. Since the electrical signal transmitted by the second electrode 120 will be sensed in the third electrode 930, this will influence a third electrode projection area the third electrode 930 projected on the touch screen. Assuming the locations and the shapes of the third electrode projection area and the second electrode projection area are similar, the touch controller obtains the tip location (the first electrode projection area) and the third electrode projection area in the second period.

Similar to the embodiments with respect to FIGS. 3 and 4, regardless of using 2D sensing information (an image) or two 1D sensing information, the touch controller is able to calculate or lookup the axial direction of a stylus body and the tilt angle based on the tip location (the first electrode projection area) and the third electrode projection area.

It should be noted that, in this embodiment, the first electrode 110 and the second electrode 120 do not necessarily have the constraint shown in FIG. 2(b), that is, at the minimum tilt angle, the first electrode projection area and the third electrode projection area can be separated (not connected). Although under this situation, noise may cause false stylus body vectors to be determined, such as the false stylus body vectors 360 (a) to (c) in FIG. 3(b).

In addition, in the second period, the electrical signals transmitted by the first electrode 110 and the second electrode 120 can be the same or different. For example, the two signals may have different frequencies, so that the touch controller is able to identify the tip location (the first electrode projection area) and the third electrode projection area based merely on the difference in the signals.

Figure 10:
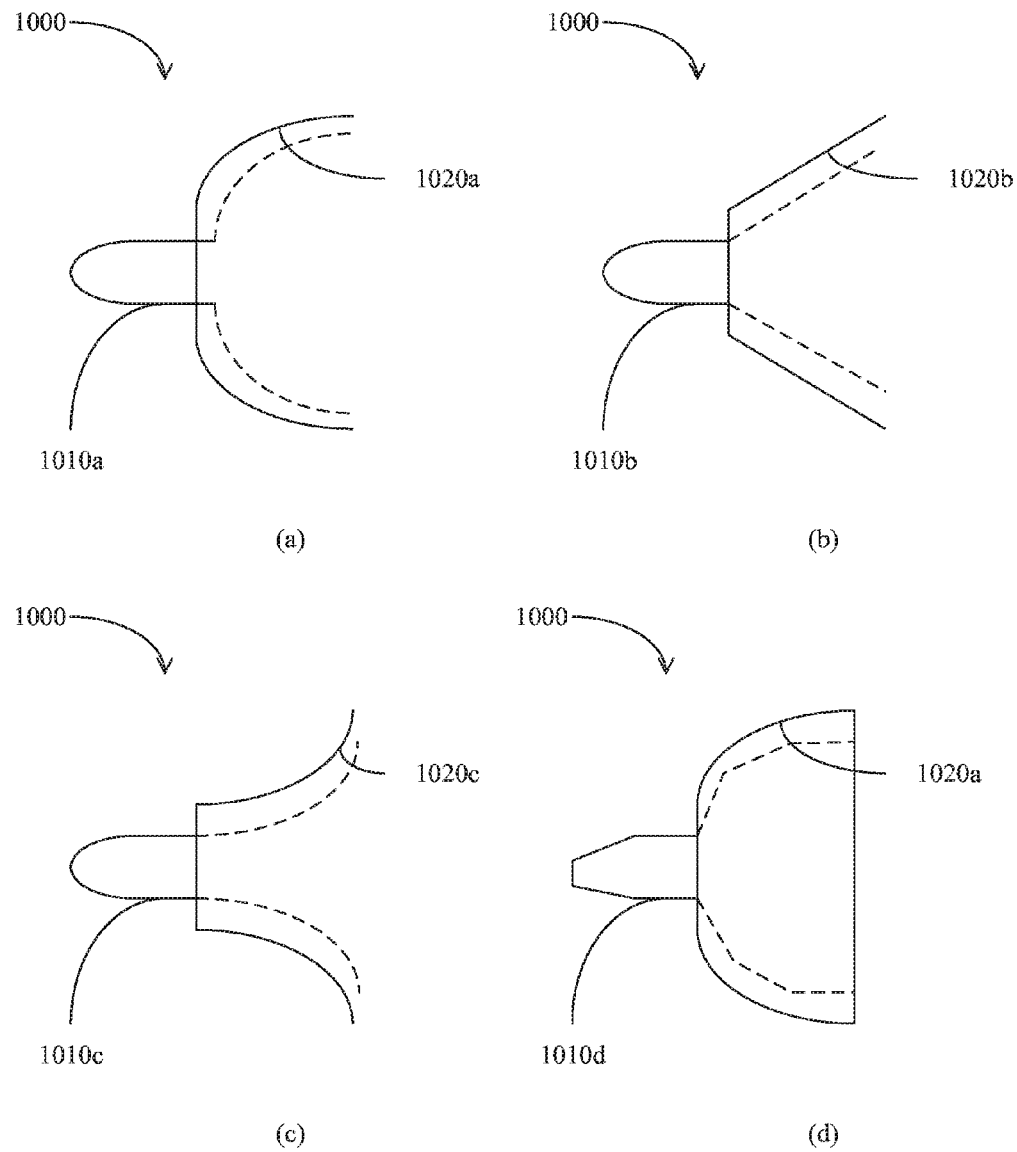
FIG. 10 depicts schematic diagrams illustrating improved stylus heads having four different electrode shapes in accordance with an embodiment of the present invention.

Referring to FIG. 10, schematic diagrams illustrating improved stylus heads having four different electrode shapes of FIG. 1. In the embodiments of FIG. 1, when in the second time period, that is, the first electrode 110 is made to emit an electrical signal, and the second electrode is made to float, as the second electrode 120 gets further away from the portion of the first electrode 110 being surrounded by the second electrode 120, the strength of the electrical signal emitted by the first electrode 110 and then sensed by the second electrode 120 gets weaker, which affects the strength of the electrical signal of the first electrode 110 sensed by the touch screen via the second electrode 120. In order to avoid the attenuation of the sensed electrical signal, in the various embodiments of FIG. 10, the structures of the first electrodes 1010 surrounded by the second electrode 1020 are modified, so that the second electrode 1020 and the surrounded portion of the first electrode 1010 can be closer to each other, allowing the second electrode 1020 to sense more of the electrical emitted by the first electrode 1010.

Although in the three embodiments of FIGS. 10(a)~(c), the shapes of the surrounded portions of the first electrodes 1010a~1010c essentially match those of the second electrodes 1020a~1020c, respectively, but the present invention does not require that the two electrodes to have matching shapes. For the purpose of convenience or cost of production or assembly, the two electrodes may not have matching shapes. For example, in the embodiment of FIG. 10(d), the cross-sectional shape of second electrode 1020a is an arc, but the surrounded portion of the first electrode 1010d does not have to be produced in an arc shape so as to save production time and cost. In fact, the various embodiments shown in FIG. 1 are also examples of the two electrodes having mismatched shapes, but in the embodiment of FIG. 10(d), the surrounded portion of the first electrode 1010d is closer to the second electrode 1020a.

Referring back to FIG. 3, which are applicable to the various embodiments and modifications described with respect to FIGS. 1 and 10. FIG. 3(a) is a top view of a touch screen 290. The stylus 100 or 1000 in accordance with an embodiment of the present invention is touching or in proximity to the touch screen 290. The stylus tip or the tip of the first electrode 1010 or 1010 of the stylus 100 or 1000 is at a stylus tip location 230.

Electrodes of the touch screen 290 are connected to a touch controller (not shown). In some embodiments, the touch screen 290 includes a plurality of parallel first touch sensitive electrodes and a plurality of parallel second touch sensitive electrodes. The first and second touch sensitive electrodes intersect to form a plurality of sensing points. The touch controller may use various methods to obtain 2D sensing information of the plurality of sensing points. Each sensing information corresponds to one sensing point. Thus, the 2D sensing information can be regarded as an image. In some embodiments, the touch controller obtains 2D sensing information by synchronizing with the stylus 100 or 1000. For example, when the touch controller asks the first touch sensitive electrodes to transmit a driving signal, the stylus 100 or 1000 emits an electrical signal upon receiving the driving signal. The electrical signal may or may not be related to the driving signal. When the electrical signal and the driving signal are related, the two can have a given amount of phase difference.

FIG. 3(b) is a schematic diagram based on 2D sensing information. Based on an image 350 detected by the touch controller, the stylus tip location 320 (i.e. a first electrode projection area) and/or a second electrode projection area 330 can be known. In some embodiments, the touch controller may obtain the stylus tip location 320 after scanning the touch screen 290 in the first time period, and obtain the stylus tip location 320 and the second electrode projection area 330 after scanning the touch screen 290 in the second time period. If multiple scans are performed, the image 350 shown in FIG. 3(b) can be obtained, which contains the stylus tip location 320 (i.e. the first electrode projection area) and the second electrode projection area 330.

Since the projection areas of the first electrode 1010 and the second electrode 1020 are contiguous, the first electrode projection area 320 and the second electrode projection area 330 are also contiguous. The touch controller is able to calculate a projection vector 340 of the stylus 100 or 1000 from projection axes of the first electrode projection area 320 and the second electrode projection area 330. The touch controller can also calculate or lookup the axial direction or tilt angle of the stylus 100 or 1000 based on the location of center of gravity, the shape, the center location or other characteristics of the second electrode projection area 330, and the stylus tip location 320.

It should be noted that in the image 350 of FIG. 3(b), there are noises indicated by black dots. The stylus tip location 320 form false stylus body vectors 360a-360c with these noises, respectively. However, since none of these noises is contiguous with the stylus tip location 320, the touch controller can determine that these signals are merely noises, and the stylus body vectors 360a-360c formed with the stylus tip location 320 are false. If the condition that the two projection areas of the first electrode 1010 and the second electrode 1020 are contiguous does not exist, then it is not possible to eliminate the false stylus body vectors 360a-360c from the image 350 and the corresponding noises.

Referring back to FIG. 4, which is applicable to the various embodiments and modifications described in relation to FIGS. 1 and 10. Different from the touch controller described in the embodiments of FIG. 3, the touch controller of FIG. 4 detects an electrical signal of the stylus 100 or 1000 using all of first touch sensitive electrodes parallel to a second axis 420 to obtain 1D sensing information 441 or 442, and the touch controller of FIG. 4 detects an electrical signal of the stylus 100 using all of second touch sensitive electrodes parallel to a first axis 410 to obtain 1D sensing information 451 or 452. It can be clearly seen that the detection results of FIG. 4 are two 1D sensing information with respect to the first axis 410 and the second axis 420, unlike the image or 2D sensing information shown in FIG. 3(b).

When the first electrode 1010 of the stylus 1000 emits an electrical signal and the second electrode 1020 is connected to ground potential or a particular DC voltage, the touch controller obtains 1D sensing information 441 and 451. Based on effective signals in the 1D sensing information 441 and 451, the touch controller obtains a first axis stylus tip coordinate 411 on the first axis 410 and a second axis stylus tip coordinate 421 on the second axis 420. The first axis stylus tip coordinate 411 and the second axis stylus tip coordinate 421 indicate the stylus tip location or a first location 431.

When the first electrode 1010 of the stylus 100 emits an electrical signal and the second electrode 1020 is floated, the touch controller obtains 1D sensing information 442 and 452. Based on effective signals in the 1D sensing information 442 and 452, the touch controller obtains a first axis stylus tip coordinate 412 on the first axis 410 and a second axis stylus tip coordinate 422 on the second axis 420. The first axis stylus tip coordinate 412 and the second axis stylus tip coordinate 422 is a second location 432.

In an embodiment, based on a stylus body vector 430 formed from the first location 431 and the second location 432, the axial direction of a stylus body can be known. Furthermore, based on the length of the stylus body vector 430, the tilt angle of the stylus 1000 can be calculated or looked up. From another perspective, the stylus body vector 430 is made up of a component of the first axis (i.e. the difference between the coordinates 411 and 412) and a component of the second axis (i.e. the difference between the coordinates 421 and 422). In other embodiments, the difference between the coordinates 411 and 412 and the difference between the coordinates 421 and 422 are not used for calculating the stylus body vector 430 and the tilt angle.

In another embodiment, the range of the effective signals of the 1D sensing information 441 projected on the first axis 410 is a first vector 461, and the range of the effective signals of the 1D sensing information 451 projected on the second axis 420 is a second vector 471. The first vector 461 and the second vector 471 are used for calculating the stylus body vector 430 and the tilt angle.

In still another embodiment, the starting point of the first vector 461 is set to the first axis stylus tip coordinate 411, thus forming a third vector 462; similarly, the starting point of the second vector 471 is set to the second axis stylus tip coordinate 421, thus forming a fourth vector 472. The third vector 462 and the fourth vector 472 are used for calculating the stylus body vector 430 and the tilt angle.

In conclusion, the present application provides a structure and a method for controlling electrical signals of an active stylus, and a corresponding method for detecting the active stylus in order to detect not only the location of the active stylus with respect to a touch screen, but also the axial direction and/or the tilt angle of the active stylus with respect to the touch screen.

Figure 11:
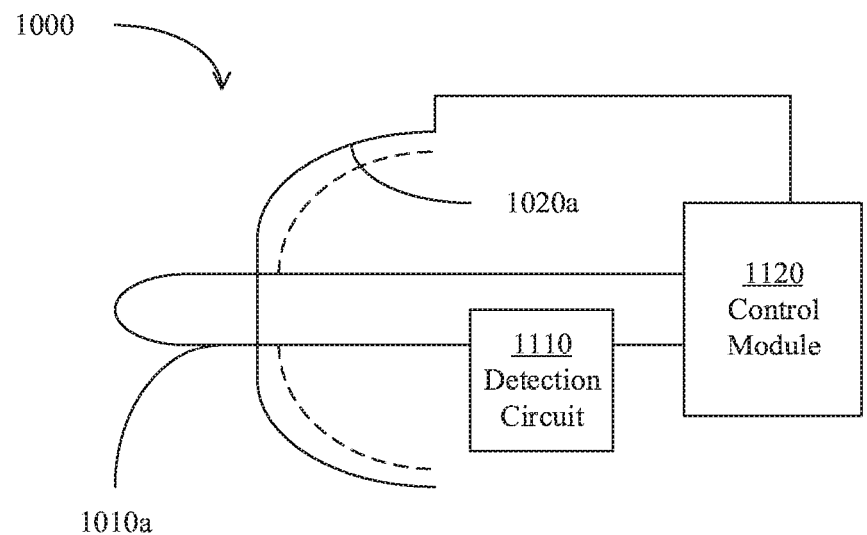
FIG. 11 is a block diagram illustrating a stylus in accordance with an embodiment of the present invention.

Referring to FIG. 11, a block diagram illustrating a stylus in accordance with an embodiment of the present invention is shown. The stylus 1000 includes a first electrode 1010a at its tip, a second electrode 1020a surrounding the first electrode 1010a, a detection circuit 1110 connected to the first electrode 1010a, and a control module 1120 connected to the first electrode 1010a, the second electrode 1020a and the detection circuit 1110. Refer to the embodiment of FIG. 10 for descriptions of the first electrode 1010a and the second electrode 1020a.

The present invention provides a stylus 1000 providing a tilt angle and an axial direction, including: a first electrode 1010a at its tip; a second electrode 1020a surrounding the first electrode 1010a, wherein the first electrode 1010a and the second electrode 1020a are not electrically coupled; and a control module 1120 connected to the first electrode 1010a, the second electrode 1020a, wherein the control module 1120 is configured to have the first electrode 1010a emit a first-time-period electrical signal and have the second electrode 1020a coupled to a direct current voltage during a first time period; the control module 1120 is further configured to have the first electrode emitting a second-time-period electrical signal and have the second electrode floated during a second time period.

In an embodiment, in order to simplify the designs of the stylus and the touch control apparatus, the first-time-period electrical signal is the same as the second-time-period electrical signal.

In an embodiment, in order to represent the pressure experienced by the first electrode 1010a, the first-time-period electrical signal and/or the second-time-period electrical signal include signals having a plurality of frequencies, the pressure experienced by the first electrode 1010a is a ratio of signal strengths of the plurality of frequencies. In this embodiment, in order to represent the state of suspension or hovering in which the stylus 1000 may be in, when the ratio is within a certain range, the first electrode 1010a is not under pressure.

In an embodiment, in order for the second electrode 1020a to sense as much the second-time-period electrical signal emitted by the first electrode 1010a as possible in the second time period, the shape of the portion of the first electrode 1010a surrounded by the second electrode 1020a corresponds to the shape of the second electrode 1020a.

In an embodiment, in order for the stylus and a touch control apparatus of a touch screen to be in synchronization with each other, the stylus 1000 further includes a detection circuit 1110 connected to the control module 1120, after the detection circuit 1110 detects a beacon signal, the control module 1120 then enters into the first time period and the second time period, wherein the order of the first and second time periods can be swapped. In this embodiment, the beacon signal is emitted by touch sensitive electrodes on the touch screen, in order for the beacon signal received to have a better SNR, the detection circuit 1110 detects the beacon signal via the first electrode 1010a. In this embodiment, a plurality of first touch sensitive electrodes on the touch screen can sequentially emit the beacon signal, or a driving signal. At the same time with or a different time from when mutual capacitive detection is carried out, the stylus is driven to enter into the first time period and the second time period. Accordingly, a plurality of second touch sensitive electrodes on the touch screen can detect the first-time-period electrical signal and the second-time-period electrical signal. Based on the location of the first touch sensitive electrode that emitted the beacon signal, and the electrical signals detected by the plurality of second touch sensitive electrodes, an image 350 of FIG. 3(b) is formed.

Figure 12:
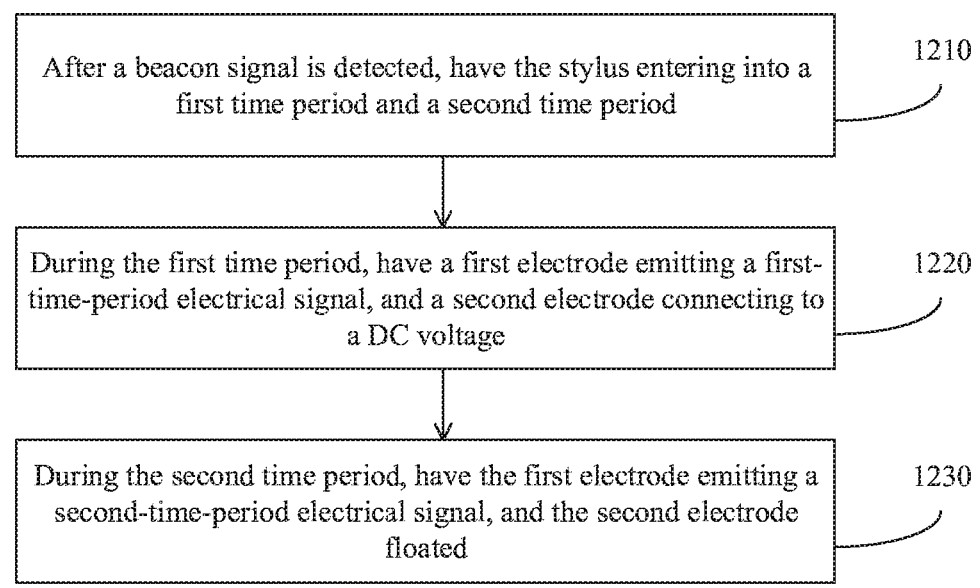
FIG. 12 is a flowchart illustrating a control method of a stylus in accordance with an embodiment of the present invention.

Referring to FIG. 12, a flowchart illustrating a control method of a stylus in accordance with an embodiment of the present invention is shown. The control method includes, but is not limited to, the following steps 1210~1230. The optional step 1210 includes: after a beacon signal is detected, having the stylus entering into a first time period and a second time period. Step 1220 includes: during the first time period, having a first electrode emitting a first-time-period electrical signal, and a second electrode connecting to a DC voltage. Step 1230 includes: during the second time period, having the first electrode emitting a second-time-period electrical signal, and the second electrode floated.

The present invention provides a control method for providing a tilt angle and an axial direction of a stylus. The stylus includes a first electrode as a stylus tip and a second electrode surrounding the first electrode, wherein the first electrode and the second electrode are not electrically coupled. The control method includes: having the first electrode emitting a first-time-period electrical signal and the second electrode connected to a DC voltage during a first time period; and having the first electrode emitting a second-time-period electrical signal and the second electrode floated during a second time period.

In an embodiment, in order to simplify the designs of the stylus and the touch sensitive apparatus, the first-time-period electrical signal is the same as the second-time-period electrical signal.

In an embodiment, in order to represent the pressure experienced by the first electrode, the first-time-period electrical signal and/or the second-time-period electrical signal include signals having a plurality of frequencies, the pressure experienced by the first electrode is a ratio of signal strengths of the plurality of frequencies. In this embodiment, in order to represent the state of suspension in which the stylus may be in, when the ratio is within a certain range, the first electrode is not under pressure.

In an embodiment, in order for the second electrode to sense as much the second-time-period electrical signal emitted by the first electrode as possible in the second time period, the shape of the portion of the first electrode surrounded by the second electrode corresponds to the shape of the second electrode.

In an embodiment, in order for the stylus and a touch control apparatus of a touch screen to be in synchronization with each other, the stylus further includes a detection circuit connected to the control module, the control method further includes: after the detection circuit detects a beacon signal, having the stylus entering into the first time period and the second time period, wherein the order of the first and second time periods can be swapped. In this embodiment, the beacon signal is emitted by touch sensitive electrodes on the touch screen, in order for the received beacon signal to have a better SNR, the detection circuit detects the beacon signal via the first electrode. In this embodiment, a plurality of first touch sensitive electrodes on the touch screen can sequentially emit the beacon signal, or a driving signal. At the same time with or a different time from when mutual capacitive detection is carried out, the stylus is driven to enter into the first time period and the second time period. Accordingly, a plurality of second touch sensitive electrodes on the touch screen can detect the first-time-period electrical signal and the second-time-period electrical signal. Based on the location of the first touch sensitive electrode that emitted the beacon signal, and the electrical signals detected by the plurality of second touch sensitive electrodes, an image 350 of FIG. 3(b) can be formed.

Figure 13:
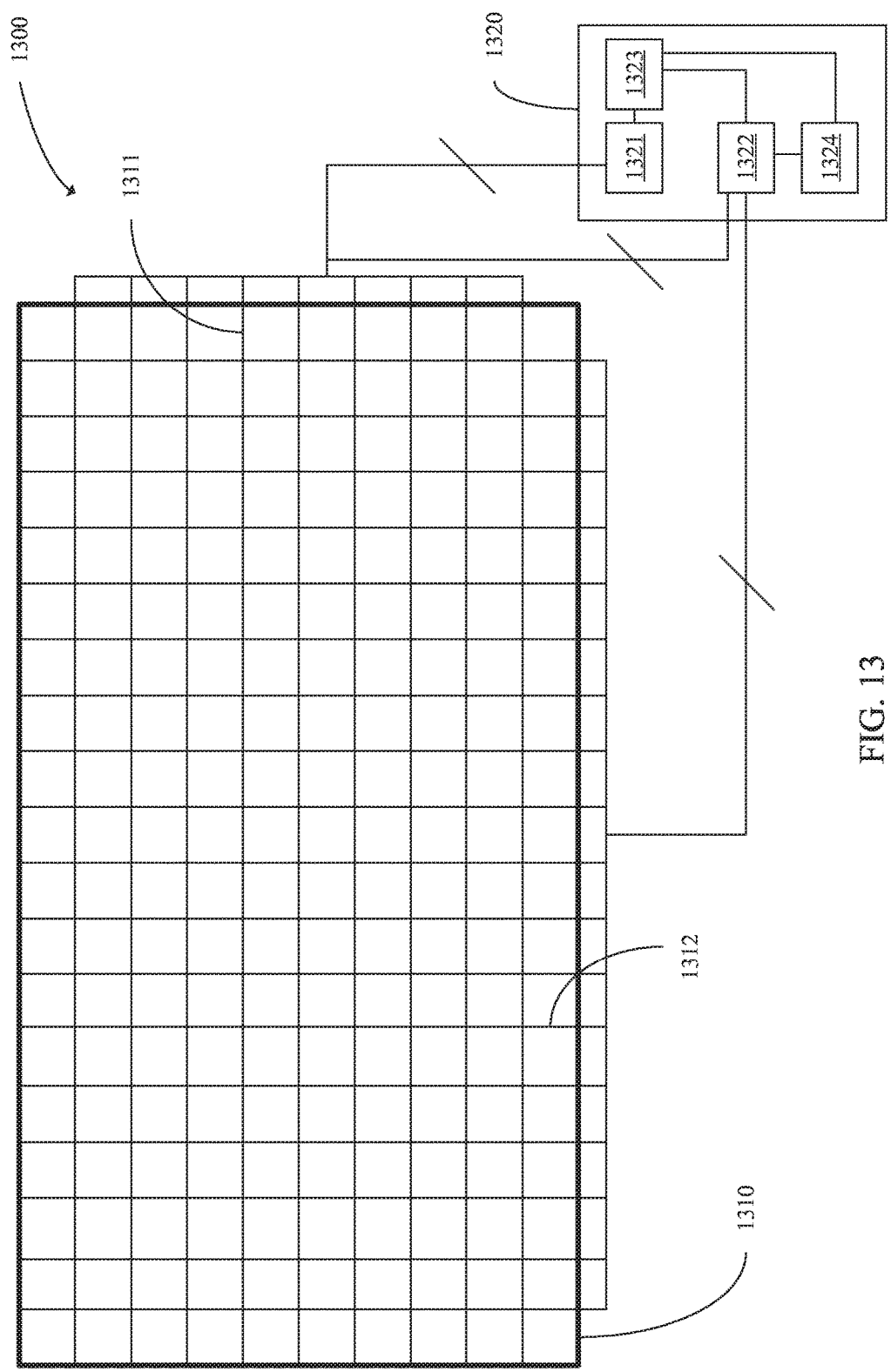
FIG. 13 is a schematic diagram depicting a touch sensitive system in accordance with an embodiment of the present invention.

Referring to FIG. 13, a schematic diagram depicting a touch sensitive system 1300 in accordance with an embodiment of the present invention is shown. The touch sensitive system 1300 includes a touch screen 1310 and a touch control apparatus 1320 connected to the touch screen 1310. The touch screen 1310 includes a plurality of first touch sensitive electrodes 1311 and a plurality of second touch sensitive electrodes 1312, the plurality of first touch sensitive electrodes 1311 and the plurality of second touch sensitive electrodes 1312 intersecting to form a plurality of sensing points. The touch control apparatus 1320 includes a sensing circuit 1322, a driving circuit 1321, a processing module 1323 connected to the driving circuit 1321 and the sensing circuit 1322. The sensing circuit 1322 is connected to the plurality of first touch sensitive electrodes 1311 and the plurality of second touch sensitive electrodes 1312. The driving circuit 1321 is connected to the plurality of first touch sensitive electrodes 1311. The following descriptions can be applied to the embodiments of FIGS. 10 to 13. The touch control apparatus 1320 may further include a signal strength detection circuit 1324 connected to the sensing circuit 1322 for measuring signal strengths.

The present invention provides a touch control apparatus 1320 for detecting a tilt angle and an axial direction of a stylus 1000, which includes: a sensing circuit 1322 connected to a touch screen 1310, wherein the touch screen 1310 includes a plurality of first touch sensitive electrodes 1311 and a plurality of second touch sensitive electrodes 1312, the plurality of first touch sensitive electrodes 1311 and the plurality of second touch sensitive electrodes 1312 intersecting to form a plurality of sensing points; and a processing module 1323 connected to the sensing circuit 1322, the processing module 1323 instructing the sensing circuit 1322 to detect a first-time-period electrical signal emitted by a first electrode 1010 of the stylus 1000 during a first time period, and instructing the sensing circuit 1322 to detect a second-time-period electrical signal emitted by the first electrode 1010 and a second electrode 1020 of the stylus 1000 during a second time period, and based on detection results of the first and second time periods, determining the tilt angle and the axial direction of the stylus 1000, wherein the second electrode 1020 surrounds the first electrode 1010, the first electrode 1010 and the second electrode 1020 are not electrically coupled.

In an embodiment, in order for the stylus and the touch control apparatus of the touch screen to be in synchronization with each other, the touch control apparatus further includes a driving circuit 1321 connected to the plurality of first touch sensitive electrodes 1311, wherein the processing module 1323 is connected to the driving circuit 1321 and is further configured to instruct the driving circuit 1321 to sequentially send a beacon signal to the plurality of first touch sensitive electrodes 1311; and after each first touch sensitive electrode 1311 emits the beacon signal, instruct the sensing circuit 1322 to perform the detection steps of the first time period and the second time period. In this embodiment, the processing module 1323 further combines detection results of the first time period, each being obtained after a first touch sensitive electrode 1311 has emitted the beacon signal, into a first image, combines detection results of the second time period, each being obtained after a first touch sensitive electrode 1311 has emitted the beacon signal, into a second image, determines a first electrode projection area corresponding to the first electrode 1010 based on the first image, determines a second electrode projection area corresponding to the second electrode 1020 based on the second image, and determines the tilt angle and the axial direction of the stylus 1000 based on the first electrode projection area and the second electrode projection area.

In an embodiment, in order to simplify the designs of the stylus and the touch control apparatus 1320, the first-time-period electrical signal is the same as the second-time-period electrical signal.

In an embodiment, the pressure experienced by the tip of the stylus is represented by a ratio of signal strengths of a plurality of frequencies. The touch control apparatus 1320 further includes at least one signal strength measuring circuit 1324 for measuring signal strengths of a plurality of frequencies included in the first-time-period electrical signal and/or the second-time-period electrical signal. The processing module 1323 further includes calculating a ratio of signal strengths of the plurality of frequencies to obtain the pressure experienced at the tip of the stylus 1000. In this embodiment, in order to represent the state of suspension in which the stylus 1000 may be in, when the ratio is within a certain range, the first electrode 1010 is not under pressure. In other words, when the ratio is within a certain range, the processing module 1323 determines that the stylus 1000 is suspended in the air.

In an embodiment, the sensing circuit 1322, during the first time period, performs sensing using all of the first touch sensitive electrodes 1311 and all of the second touch sensitive electrodes 1322 to obtain a first-time-period 1D sensing information of a first axis and a first-time-period 1D sensing information of a second axis, respectively; the sensing circuit 1322, during the second time period, performs sensing using all of the first touch sensitive electrodes 1311 and all of the second touch sensitive electrodes 1322 to obtain a second-time-period 1D sensing information of a first axis and a second-time-period 1D sensing information of a second axis, respectively; the processing module 1323 calculates a first electrode projection area of the first electrode 1010 with respect to the first axis and the second axis based on the first-time-period 1D sensing information of the first axis and the first-time-period 1D sensing information of the second axis; calculates a second electrode projection area of the first electrode 1010 and the second electrode 1020 with respect to the first axis and the second axis based on the second-time-period 1D sensing information of the first axis and the second-time-period 1D sensing information of the second axis; and determines the tilt angle and the axial direction of the stylus 1000 based on the first electrode projection area and the second electrode projection area. In this embodiment, the processing module 1323 further calculates the location of a first center of gravity of the first electrode projection area; calculates the location of a second center of gravity of the second electrode projection area; and determines the tilt angle and the axial direction of the stylus 1000 based on the location of the first center of gravity and the location of the second center of gravity.

Figure 14:
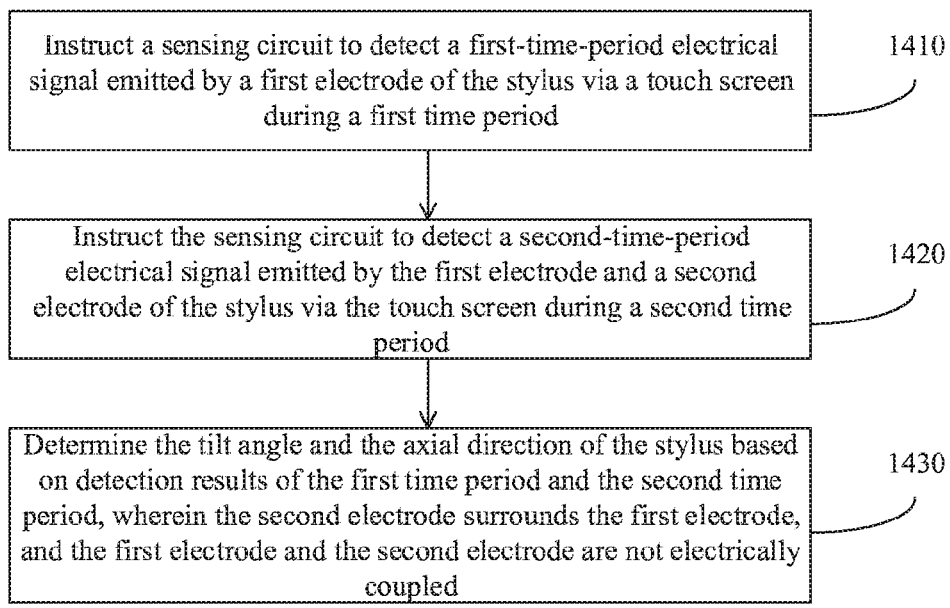
FIG. 14 is a flowchart illustrating a control method for detecting a tilt angle and an axial direction of a stylus provided by the present invention.

Referring to FIG. 14, a flowchart illustrating a control method capable of detecting a tilt angle and an axial direction of a stylus provided by the present invention is shown, which is applicable to the touch control apparatus 1320 of FIG. 13. The control method includes, but is not limited to, the following steps. Step 1410 includes instructing a sensing circuit to detect a first-time-period electrical signal emitted by a first electrode of the stylus via a touch screen during a first time period. Step 1420 includes instructing the sensing circuit to detect a second-time-period electrical signal emitted by the first electrode and a second electrode of the stylus via the touch screen during a second time period. Step 1430 includes determining the tilt angle and the axial direction of the stylus based on detection results of the first time period and the second time period, wherein the second electrode surrounds the first electrode, and the first electrode and the second electrode are not electrically coupled.

In an embodiment, in order for the stylus and the touch control apparatus of the touch screen to be in synchronization with each other, the control method further includes instructing a driving circuit to sequentially send a beacon signal to a plurality of first touch sensitive electrodes of the touch screen; and after each first touch sensitive electrode emits the beacon signal, instructing the sensing circuit to perform the detection steps of the first time period and the second time period. In this embodiment, the control method further includes combining detection results of the first time period, each being obtained after a first touch sensitive electrode has emitted the beacon signal, into a first image, combining detection results of the second time period, each being obtained after a first touch sensitive electrode has emitted the beacon signal, into a second image, determining a first electrode projection area corresponding to the first electrode based on the first image, determining a second electrode projection area corresponding to the second electrode based on the second image, and determining the tilt angle and the axial direction of the stylus based on the first electrode projection area and the second electrode projection area.

In an embodiment, in order to simplify the designs of the stylus and the touch control apparatus, the first-time-period electrical signal is the same as the second-time-period electrical signal.

In an embodiment, the pressure experienced at the tip of the stylus is represented by a ratio of signal strengths of a plurality of frequencies. The control method further includes instructing a signal strength measuring circuit to measure signal strengths of a plurality of frequencies included in the first-time-period electrical signal and/or the second-time-period electrical signal; and calculating a ratio of signal strengths of the plurality of frequencies to obtain the pressure experienced at the tip of the stylus. In this embodiment, when the ratio is within a certain range, the stylus is determined to be suspended in the air.

In an embodiment, the control method further includes: during the first time period, instructing the sensing circuit to perform sensing using all of the first touch sensitive electrodes and all of the second touch sensitive electrodes to obtain a first-time-period 1D sensing information of a first axis and a first-time-period 1D sensing information of a second axis, respectively; during the second time period, instructing the sensing circuit to perform sensing using all of the first touch sensitive electrodes and all of the second touch sensitive electrodes to obtain a second-time-period 1D sensing information of a first axis and a second-time-period 1D sensing information of a second axis, respectively; calculating a first electrode projection area of the first electrode with respect to the first axis and the second axis based on the first-time-period 1D sensing information of the first axis and the first-time-period 1D sensing information of the second axis; calculating a second electrode projection area of the first electrode and the second electrode with respect to the first axis and the second axis based on the second-time-period 1D sensing information of the first axis and the second-time-period 1D sensing information of the second axis; and determining the tilt angle and the axial direction of the stylus based on the first electrode projection area and the second electrode projection area.

The present invention provides a touch sensitive system 1300 capable of detecting a tilt angle and an axial direction of a stylus 1000. The touch sensitive system 1300 includes: a stylus 1000 including a control module; a first electrode 1010 at a tip of the stylus and a second electrode 1020 surrounding the first electrode 1010, wherein the first electrode 1010 and the second electrode 1020 are not electrically coupled, the control module instructs the first electrode to emit a first-time-period electrical signal and instructs the second electrode to connect to a DC voltage during a first time period, the control module further instructs the first electrode to emit a second-time-period electrical signal and instructs the second electrode to float during a second time period; a touch screen 1310; and a touch control apparatus 1320. The touch screen 1310 includes a plurality of first touch sensitive electrodes 1311 and a plurality of second touch sensitive electrodes 1312, the plurality of first touch sensitive electrodes 1311 and the plurality of second touch sensitive electrodes 1312 forming a plurality of sensing points. The touch control apparatus 1320 includes: a sensing circuit 1322 connected to the touch screen 1310, and a processing module 1323 connected to the sensing circuit 1322. The processing module 1323 instructs the sensing circuit 1322 to detect the first-time-period electrical signal emitted by the first electrode 1010 of the stylus 1000 during the first time period, and instructs the sensing circuit 1322 to detect the second-time-period electrical signal emitted by the first electrode 1010 and a second electrode 1020 of the stylus 1000 during the second time period, and based on detection results of the first and second time periods, determines a tilt angle and an axial direction of the stylus 1000.

Figure 15:
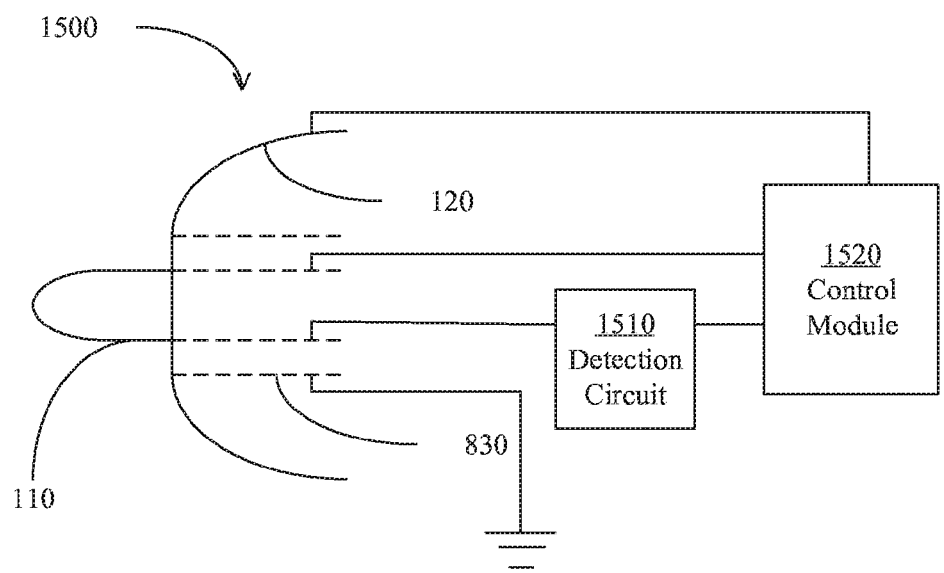
FIG. 15 is a block diagram depicting a stylus in accordance with an embodiment of the present invention.

Referring to FIG. 15, a block diagram depicting a stylus 1500 in accordance with an embodiment of the present invention is shown. The stylus 1500 includes various elements of FIG. 8, and is applicable to the descriptions with respect to FIG. 8. In addition, the stylus 1500 further includes a detection module 1510 and a control module 1520. The detection module 1510 is similar to the detection module 1110 of FIG. 11. The control module is connected to the first electrode 110, the second electrode 120 and the detection module 1510.

The present invention provides a stylus for providing a tilt angle and an axial direction, which may include: a first electrode 110 at a tip of the stylus; a third electrode 830 surrounding the first electrode 110; a second electrode 120 surrounding the third electrode 830, wherein the first electrode 110, the second electrode 120 and the third electrode 830 are not electrically coupled, the third electrode 830 is connected to ground potential for shielding the first electrode 110 and the second electrode 120; and a control module 1520 connecting the first electrode 110 and the second electrode 120, wherein the control module 1520 instructs the first electrode 110 to emit a first-time-period electrical signal during a first time period, and instructs the second electrode 120 to emit a second-time-period electrical signal during a second time period.

In an embodiment, in order to maintain design flexibility, in the first time period, the second electrode is connected to ground potential or floated.

In an embodiment, in order to simplify the designs of the stylus and the touch control apparatus, the first-time-period electrical signal is the same as the second-time-period electrical signal.

In an embodiment, in order to represent the pressure experienced by the first electrode 110, the first-time-period electrical signal and/or the second-time-period electrical signal includes signals of a plurality of frequencies, and the pressure experienced by the first electrode 110 is a ratio of signal strengths of the plurality of frequencies. In this embodiment, in order to represent the state of suspension in which the stylus 1500 may be in, when the ratio is within a certain range, the first electrode 110 is not under pressure.

In an embodiment, in order for the stylus and a touch control apparatus of a touch screen to be in synchronization with each other, the stylus 1500 further includes a detection circuit 1510 connected to the control module 1520, after the detection circuit 1510 detects a beacon signal, the control module 1120 then enters into the first time period and the second time period, wherein the order of the first and second time periods can be swapped. In this embodiment, the beacon signal is emitted by touch sensitive electrodes on the touch screen, in order for the beacon signal received to have a better SNR, the detection circuit 1510 detects the beacon signal via the first electrode 110. In this embodiment, a plurality of first touch sensitive electrodes on the touch screen can sequentially emit the beacon signal, or a driving signal. At the same time with or a different time from when mutual capacitive detection is carried out, the stylus is driven to enter into the first time period and the second time period. Accordingly, a plurality of second touch sensitive electrodes on the touch screen can detect the first-time-period electrical signal and the second-time-period electrical signal. Based on the location of the first touch sensitive electrode that emitted the beacon signal, and the electrical signals detected by the plurality of second touch sensitive electrodes, an image 350 of FIG. 3(*b*) is formed.

Figure 16:
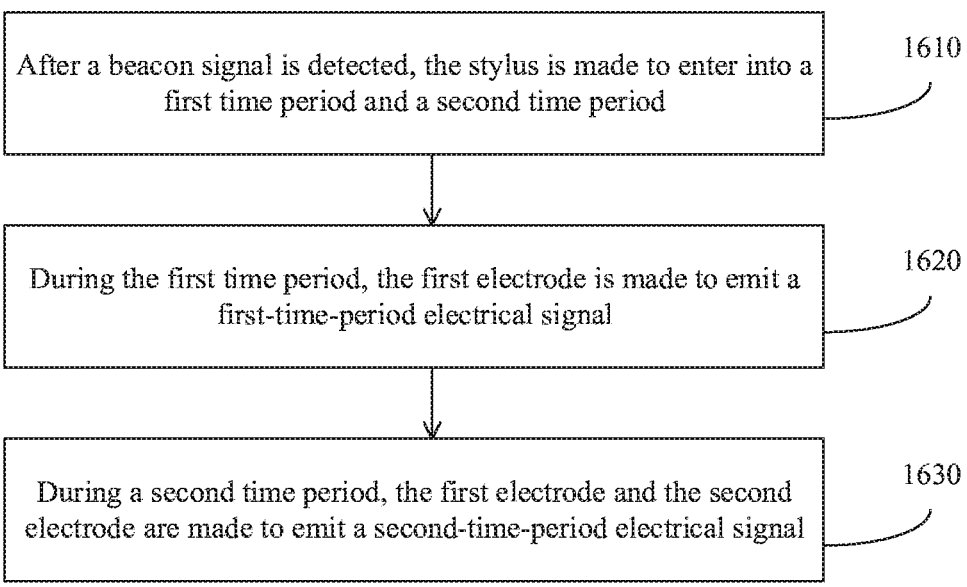
FIG. 16 is a flowchart illustrating a control method of a stylus in accordance with an embodiment of the present invention.

Referring to FIG. 16, a flowchart illustrating a control method of a stylus in accordance with an embodiment of the present invention is shown. The control method is applicable to the stylus of FIG. 15. The control method includes, but is not limited to, the following steps. In an optional step 1610, after a beacon signal is detected, the stylus is made to enter into a first time period and a second time period. In step 1620, during the first time period, the first electrode is made to emit a first-time-period electrical signal. In step 1630, during a second time period, the first electrode and the second electrode are made to emit a second-time-period electrical signal. In said step 1620, the second electrode is made to connect to ground potential or float.

The present invention provides a control method for providing a tilt angle and an axial direction of a stylus. The stylus includes a first electrode as a stylus tip, a third electrode surrounding the first electrode, and a second electrode surrounding the third electrode, wherein the first electrode, the second electrode and the third electrode are not electrically coupled, the third electrode is connected to ground potential for shielding the first and second electrodes. The control method includes: having the first electrode emitting a first-time-period electrical signal during a first time period; and having the first electrode and the second electrode emitting a second-time-period electrical signal during a second time period.

In an embodiment, the control method includes: during the first time period, having the second electrode connected to ground potential or floated.

In an embodiment, in order to simplify the designs of the stylus and the touch control apparatus, the first-time-period electrical signal is the same as the second-time-period electrical signal.

In an embodiment, in order to represent the pressure experienced by the first electrode 110, the first-time-period electrical signal and/or the second-time-period electrical signal include signals having a plurality of frequencies, the pressure experienced by the first electrode is a ratio of signal strengths of the plurality of frequencies. In this embodiment, in order to represent the state of suspension in which the stylus 1500 may be in, when the ratio is within a certain range, the first electrode is not under pressure.

In an embodiment, in order for the stylus and a touch control apparatus of a touch screen to be in synchronization with each other, the stylus further includes a detection circuit connected to the control module, after the detection circuit 1510 detects a beacon signal, the control module 1120 then enters into the first time period and the second time period, wherein the order of the first and second time periods can be swapped. In this embodiment, the beacon signal is emitted by touch sensitive electrodes on the touch screen, in order for the beacon signal received to have a better SNR, the detection circuit 1510 detects the beacon signal via the first electrode 110. In this embodiment, a plurality of first touch sensitive electrodes on the touch screen can sequentially emit the beacon signal, or a driving signal. At the same time with or a different time from when mutual capacitive detection is carried out, the stylus is driven to enter into the first time period and the second time period. Accordingly, a plurality of second touch sensitive electrodes on the touch screen can detect the first-time-period electrical signal and the second-time-period electrical signal. Based on the location of the first touch sensitive electrode that emitted the beacon signal, and the electrical signals detected by the plurality of second touch sensitive electrodes, an image 350 of FIG. 3(b) is formed.

The present invention provides a touch sensitive system capable of detecting a tilt angle and an axial direction of a stylus. The touch sensitive system includes: a stylus; a touch screen; and a touch control apparatus. The stylus includes: a first electrode at a tip of the stylus; a third electrode surrounding the first electrode; and a second electrode surrounding the third electrode, wherein the first electrode, the second electrode and the third electrode are not electrically coupled, the third electrode is connected to ground potential for shielding the first and second electrodes; and a control module connected to the first and the second electrodes, wherein the control module instructs the first electrode to emit a first-time-period electrical signal during a first time period, instructs the first electrode and the second electrode to emit a second-time-period electrical signal during a second time period. The touch screen includes a plurality of first touch sensitive electrodes and a plurality of second touch sensitive electrodes, the plurality of first touch sensitive electrodes and the plurality of second touch sensitive electrodes forming a plurality of sensing points. The touch control apparatus includes: a sensing circuit connected to the touch screen, and a processing module connected to the sensing circuit. The processing module instructs the sensing circuit to detect the first-time-period electrical signal emitted by the first electrode of the stylus during the first time period, and instructs the sensing circuit to detect the second-time-period electrical signal emitted by the first electrode and a second electrode of the stylus during the second time period, and based on detection results of the first and second time periods, determines a tilt angle and an axial direction of the stylus.

Figure 17:
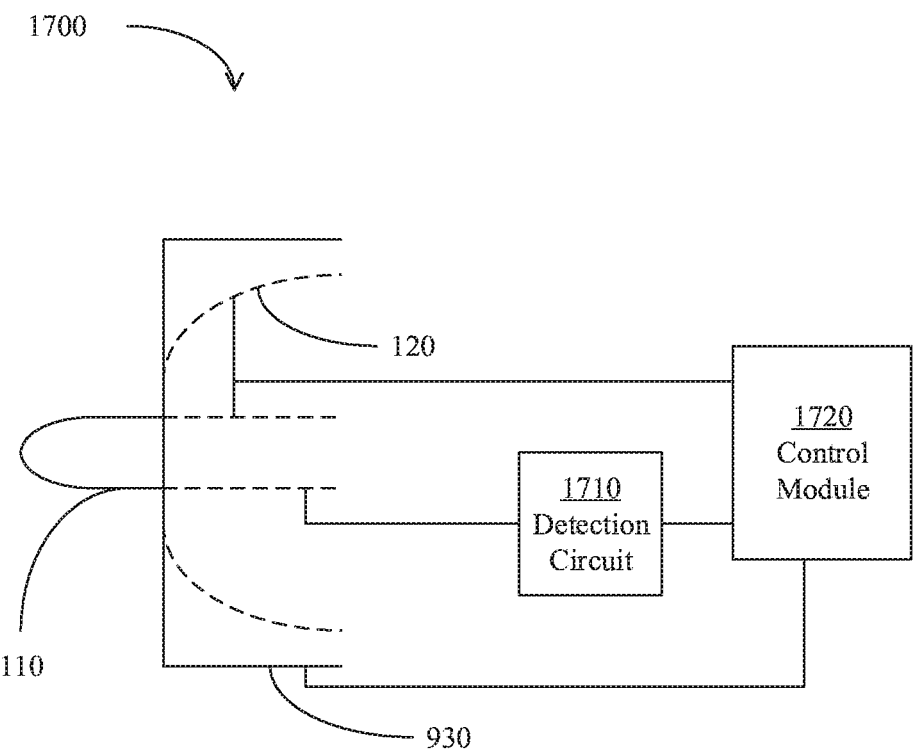
FIG. 17 is a block diagram depicting a stylus in accordance with an embodiment of the present invention.

Referring to FIG. 17, a block diagram depicting a stylus 1700 in accordance with an embodiment of the present invention is shown. The stylus 1700 includes various elements of FIG. 9, and is applicable to the descriptions with respect to FIG. 9. In addition, the stylus 1700 further includes a detection module 1710 and a control module 1720. The detection module 1710 is similar to the detection module 1110 of FIG. 11. The control module 1720 is connected to the first electrode 110, the second electrode 120, the third electrode 930 and the detection module 1710.

The present invention provides a stylus 1700 for providing a tilt angle and an axial direction, which may include: a first electrode 110 at a tip of the stylus; a second electrode 120 surrounding the first electrode 110; a third electrode 930 surrounding the second electrode 120, wherein the first electrode 110 and the third electrode 930 are not electrically coupled, the second electrode 120 and the third electrode 930 are not electrically coupled; and a control module 1720 connecting the first electrode 110, the second electrode 120 and the third electrode 930, wherein the control module 1720 instructs the first electrode 110 and the second electrode 120 to emit a first-time-period electrical signal during a first time period, and instructs the first electrode 110 and the second electrode 120 to emit a second-time-period electrical signal and the third electrode 930 to float during a second time period.

In an embodiment, in order to reduce design complexity, the first electrode and the second electrode are electrically coupled.

In an embodiment, in order to simplify the designs of the stylus and the touch control apparatus, the first-time-period electrical signal is the same as the second-time-period electrical signal.

In an embodiment, in order to represent the pressure experienced by the first electrode 110, the first-time-period electrical signal and/or the second-time-period electrical signal includes signals of a plurality of frequencies, and the pressure experienced by the first electrode 110 is a ratio of signal strengths of the plurality of frequencies. In this embodiment, in order to represent the state of suspension in which the stylus 1700 may be in, when the ratio is within a certain range, the first electrode 110 is not under pressure.

In an embodiment, in order for the stylus and a touch control apparatus of a touch screen to be in synchronization with each other, the stylus 1700 further includes a detection circuit 1710 connected to the control module 1720, after the detection circuit 1710 detects a beacon signal, the control module 1720 then enters into the first time period and the second time period, wherein the order of the first and second time periods can be swapped. In this embodiment, the beacon signal is emitted by touch sensitive electrodes on the touch screen, in order for the beacon signal received to have a better SNR, the detection circuit 1710 detects the beacon signal via the first electrode 110. In this embodiment, a plurality of first touch sensitive electrodes on the touch screen can sequentially emit the beacon signal, or a driving signal. At the same time with or a different time from when mutual capacitive detection is carried out, the stylus is driven to enter into the first time period and the second time period. Accordingly, a plurality of second touch sensitive electrodes on the touch screen can detect the first-time-period electrical signal and the second-time-period electrical signal. Based on the location of the first touch sensitive electrode that emitted the beacon signal, and the electrical signals detected by the plurality of second touch sensitive electrodes, an image 350 of FIG. 3(b) is formed.

Figure 18:
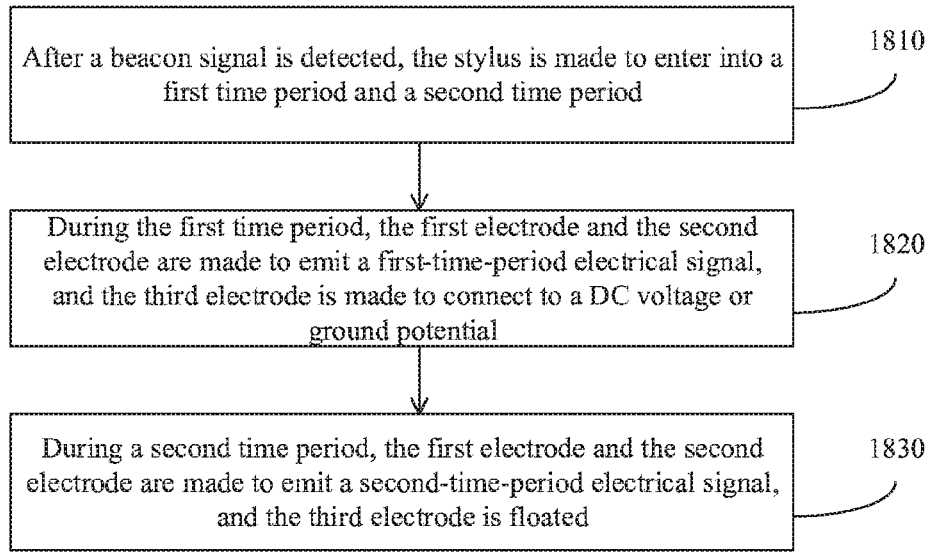
FIG. 18 is a flowchart illustrating a control method of a stylus in accordance with an embodiment of the present invention.

Referring to FIG. 18, a flowchart illustrating a control method of a stylus in accordance with an embodiment of the present invention is shown. The control method is applicable to the stylus of FIG. 17. The control method includes, but is not limited to, the following steps. In an optional step 1810, after a beacon signal is detected, the stylus is made to enter into a first time period and a second time period. In step 1820, during the first time period, the first electrode and the second electrode are made to emit a first-time-period electrical signal, and the third electrode is made to connect to a DC voltage or ground potential. In step 1830, during a second time period, the first electrode and the second electrode are made to emit a second-time-period electrical signal, and the third electrode is floated.

The present invention provides a control method for providing a tilt angle and an axial direction of a stylus, wherein the stylus includes a first electrode as a stylus tip, a second electrode surrounding the first electrode, and a third electrode surrounding the second electrode, wherein the first electrode and the third electrode are not electrically coupled, the second electrode and the third electrode are not electrically coupled. The control method includes: having the first electrode and the second electrode emitting a first-time-period electrical signal and the third electrode connecting to a DC voltage during a first time period; and having the first electrode and the second electrode emitting a second-time-period electrical signal and the third electrode floated during a second time period.

In an embodiment, in order to reduce design complexity, the first and the second electrodes are electrically coupled.

In an embodiment, in order to simplify the designs of the stylus and the touch control apparatus, the first-time-period electrical signal is the same as the second-time-period electrical signal.

In an embodiment, in order to represent the pressure experienced by the first electrode, the first-time-period electrical signal and/or the second-time-period electrical signal include signals having a plurality of frequencies, the pressure experienced by the first electrode is a ratio of signal strengths of the plurality of frequencies. In this embodiment, in order to represent the state of suspension in which the stylus may be in, when the ratio is within a certain range, the first electrode is not under pressure.

In an embodiment, in order for the stylus and a touch control apparatus of a touch screen to be in synchronization with each other, the stylus further includes a detection circuit, after the detection circuit detects a beacon signal, the stylus then enters into the first time period and the second time period, wherein the order of the first and second time periods can be swapped. In this embodiment, the beacon signal is emitted by touch sensitive electrodes on the touch screen, in order for the beacon signal received to have a better SNR, the detection circuit detects the beacon signal via the first electrode. In this embodiment, a plurality of first touch sensitive electrodes on the touch screen can sequentially emit the beacon signal, or a driving signal. At the same time with or a different time from when mutual capacitive detection is carried out, the stylus is driven to enter into the first time period and the second time period. Accordingly, a plurality of second touch sensitive electrodes on the touch screen can detect the first-time-period electrical signal and the second-time-period electrical signal. Based on the location of the first touch sensitive electrode that emitted the beacon signal, and the electrical signals detected by the plurality of second touch sensitive electrodes, an image 350 of FIG. 3(*b*) is formed.

The present invention provides a touch sensitive system capable of detecting a tilt angle and an axial direction of a stylus. The touch sensitive system includes: a stylus; a touch screen; and a touch control apparatus. The stylus includes: a first electrode at a tip of the stylus; a second electrode surrounding the first electrode; and a third electrode surrounding the second electrode, wherein the first electrode and the third electrode are not electrically coupled, the second electrode and the third electrode are not electrically coupled; and a control module connected to the first, the second and the third electrodes, wherein the control module instructs the first electrode and the second electrode to emit a first-time-period electrical signal, and the third electrode to connect to a DC voltage during a first time period, instructs the first electrode and the second electrode to emit a second-time-period electrical signal and the third electrode to float during a second time period. The touch screen includes a plurality of first touch sensitive electrodes and a plurality of second touch sensitive electrodes, the plurality of first touch sensitive electrodes and the plurality of second touch sensitive electrodes forming a plurality of sensing points. The touch control apparatus includes: a sensing circuit connected to the touch screen, and a processing module connected to the sensing circuit. The processing module instructs the sensing circuit to detect the first-time-period electrical signal emitted by the stylus during the first time period, and instructs the sensing circuit to detect the second-time-period electrical signal emitted by the stylus during the second time period, and based on detection results of the first and second time periods, determines a tilt angle and an axial direction of the stylus.

Figure 19:
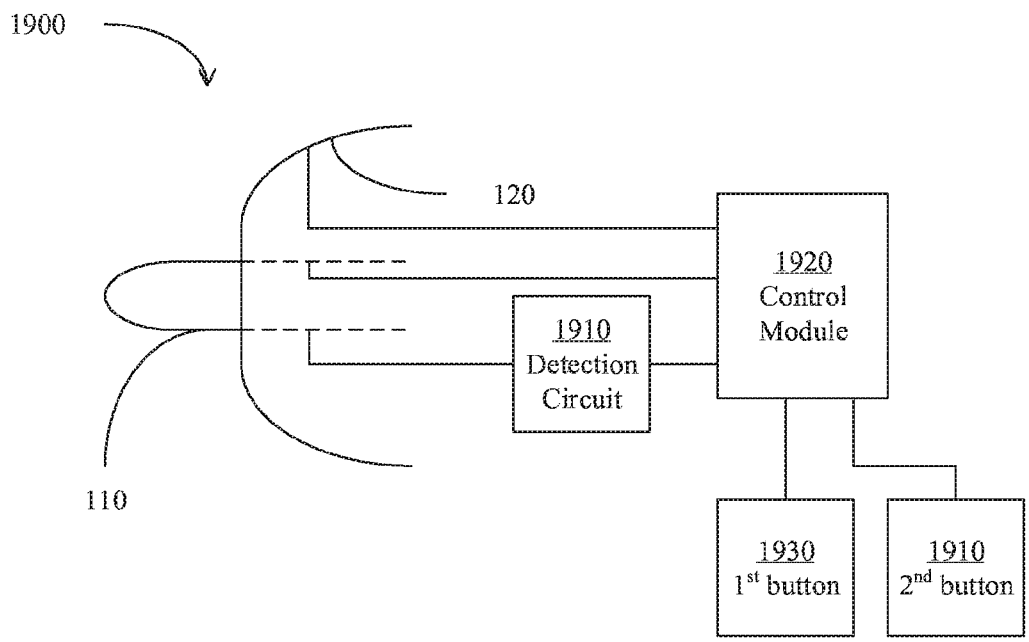
FIG. 19 is a schematic diagram depicting a stylus in accordance with an embodiment of the present invention.

Referring to FIG. 19, a schematic diagram depicting a stylus in accordance with an embodiment of the present invention is shown. The stylus 1900 includes a first electrode 110 at the stylus tip and a second electrode 120 surrounding the first electrode 110 like those shown in FIG. 1. In addition to these two electrodes, the stylus 1900 further includes a detection circuit 1910 for detecting a beacon signal, especially detecting a beacon signal via the first electrode 110, the detection result can be provided to a control module 1920. The stylus 1900 may further include two buttons 1930 and 1940, which may be the barrel button and the eraser button shown in FIG. 7, respectively. The control module 1920 is connected to the first and second buttons 1930 and 1940 and is capable of detecting if these two buttons 1930 and 1940 are suppressed or not.

After the detection circuit 1910 detected a beacon signal, the control module 1920 can carry out one of the three modulation sequences shown in FIG. 7. For example, when the stylus 1900 is set to carry out modulation according to the first modulation sequence 701, the control module 1920 will instruct the first and the second electrodes 110 and 120 to emit electrical signals in three periods based on the statues of the first button 1930 and the second button 1940. For example, when no button is pressed, the first modulation 601 is performed in the first period; the second modulation 602 is performed in the second period; and the third modulation 603 is performed in the third period. As another example, when the second button 1940 or the barrel button is pressed, the second modulation 602 is performed in the first period; the first modulation 601 is performed in the second period; and the third modulation 603 is performed in the third period. As still another example, when the first button 1930 or the eraser button is pressed, the third modulation 603 is performed in the first period; the second modulation 602 is performed in the second period; and the first modulation 601 is performed in the third period.

In this embodiment, since the first modulation sequence 701 includes the first modulation 601, the touch control apparatus can find the first electrode projection area based on the first modulation 601. Similarly, as the first modulation sequence 701 includes the second modulation 602, the touch control apparatus can find the second electrode projection area based on the second modulation 602. Based on the first electrode projection area and the second electrode projection area, the touch control apparatus can then determine the axial direction and the tilt angle of the stylus 1900. One with ordinary skill in the art can appreciate that the touch control apparatus can determine the axial direction and the tilt angle of the stylus 1900 based on any two of the first, second and third modulations. Moreover, the touch control apparatus can determine the modulation sequence 701 based on the signal strengths of the various periods. From the modulation sequence 701, the statues of the two buttons can be further determined. For example, when the touch control apparatus detects the strengths of electrical signals emitted by the stylus 1900 in the three periods are sequentially medium, weakest, and strongest, then it can be determined that the eraser button of the stylus 1900 employing the first modulation sequence 701 is being pressed. As another example, when the touch control apparatus detects the strengths of electrical signals emitted by the stylus 1900 in the three periods are sequentially strongest, medium and weakest, then it can be determined that the barrel button of the stylus 1900 employing the first modulation sequence 701 is being pressed.

When a touch sensitive system corresponding to the stylus 1900 is capable of detecting a plurality of stylus 1900 simultaneously, a second stylus 1900 may use the second modulation sequence 702 in FIG. 7, and a third stylus 1900 may use the third modulation sequence 703. When a touch sensitive system corresponding to the stylus 1900 can only detect a single stylus 1900 at a time, the second modulation sequence 702 and the third modulation sequence 703 shown in FIG. 7 are not used. Therefore, the control module 1920 of the stylus 1900 may add another modulation combination to the first modulation sequence to represent the situation where both the first button 1930 and the second button 1940 are being pressed. For example, the third modulation 603 is carried out in the first period; the first modulation 601 is carried out in the second period; and the second modulation 602 is carried out in the third period.

In addition to the modulations shown in FIGS. 6 and 7, since the stylus 1900 includes a detection circuit 1910, the beacon signal transmitted by the touch screen can be used for synchronization, so another modulation in which no electrical signal is emitted can be added. FIG. 20 shows a table of four modulations in accordance with an embodiment of the present invention. Compared to FIG. 6, a fourth modulation 604 is added to the embodiment of FIG. 20, that is, a modulation in which the first electrode 110 and the second electrode 120 do not emit any electrical signal. Since no electrical signal is emitted in the fourth modulation 604, the corresponding signal strength is thus zero.

Referring to FIG. 21, a schematic diagram illustrating modulation sequences in accordance with an embodiment of the present invention is shown. Based on the four modulations shown in FIG. 20, a modulation sequence in FIG. 21 includes four time periods, each period is one of the four modulations of FIG. 20. Since a modulation sequence 2101 or 2102 is a combination of the four modulations, a modulation representing both the first button 1930 and the second button 1940 are pressed when a plurality of stylus 1900 are present simultaneously.

Figure 22:
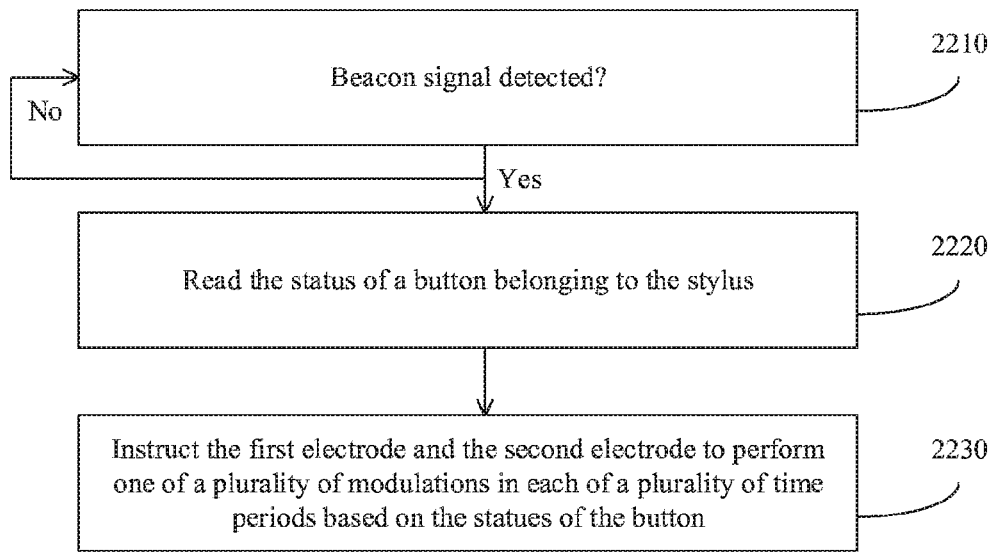
FIG. 22 is a flowchart illustrating a control method of a stylus in accordance with an embodiment of the present invention.

Referring to FIG. 22, a flowchart illustrating a control method of a stylus in accordance with an embodiment of the present invention is shown. The control method is applicable to the control module 1920 of the stylus 1900 shown in FIG. 19, which includes, but is not limited to, the following steps. First, an optional step 2210 includes the detection circuit 1910 determining if a beacon signal is detected. If not, the method can wait a while before returning to step 2210. If a beacon signal is detected, the method proceeds to step 2220. Step 2220 includes detecting or reading the status of a button belonging to the stylus, that is, if they are being pressed. Next, step 2230 includes instructing the first electrode and the second electrode to perform one of a plurality of modulations in each of a plurality of time periods based on the status of the button. In an example, the plurality of modulations include the following three types: instructing the first electrode to emit an electrical signal; instructing the second electrode to emit an electrical signal; and instructing both the first and the second electrodes to emit electrical signals simultaneously.

The present invention provides a stylus for providing a tilt angle and an axial direction, including: a first electrode at a tip of the stylus; a second electrode surrounding the first electrode; a first button; and a control module connected to the first electrode, the second electrode and the first button, wherein the control module is configured for instructing the first electrode and the second electrode to perform one of a plurality of modulations in each of a plurality of time periods based on the status of the first button, wherein the plurality of modulations include the following three types: instructing the first electrode to emit an electrical signal; instructing the second electrode to emit an electrical signal; and instructing both the first and the second electrodes to emit electrical signals simultaneously.

In an embodiment, in order to facilitate synchronization with a touch control apparatus of a touch screen, the stylus further includes a detection circuit for detecting a beacon signal, wherein after the detection circuit detects a beacon signal, the stylus instructs the first electrode and the second electrode to perform one of the plurality of modulations in each of the plurality of time periods based on the status of the first button. In this embodiment, the beacon signal is emitted by touch sensitive electrodes on the touch screen, in order for the beacon signal received to have a better SNR, the detection circuit detects the beacon signal via the first electrode. In this embodiment, a plurality of first touch sensitive electrodes on the touch screen can sequentially emit the beacon signal, or a driving signal. At the same time with or a different time from when mutual capacitive detection is carried out, the stylus is driven to enter into the plurality of time periods. Accordingly, a plurality of second touch sensitive electrodes on the touch screen can detect the electrical signals of the plurality of time periods. Based on the location of the first touch sensitive electrode that emitted the beacon signal, and the electrical signals detected by the plurality of second touch sensitive electrodes, the image 350 of FIG. 3(b) is formed.

In an embodiment, in order to increase the types of the modulation sequence so as to represent more statues of the same stylus, or to represent the statues of a plurality of stylus at the same time, the plurality of modulations further include: instructing the first electrode and the second electrode to not emit electrical signals simultaneously.

In an embodiment, the stylus further includes a second button connected to the control module, wherein the control module is configured for instructing the first electrode and the second electrode to perform one of the plurality of modulations in each of the plurality of time periods based on the statues of the first button and the second button.

In an embodiment, for design convenience in the stylus and the touch control apparatus, the electrical signals emitted in the plurality of time periods are all the same.

In an embodiment, in order to represent the pressure experienced by the first electrode, the electrical signal includes signals having a plurality of frequencies, the pressure experienced by the first electrode is a ratio of signal strengths of the plurality of frequencies. In this embodiment, in order to represent the state of suspension in which the stylus may be in, when the ratio is within a certain range, the first electrode is not under pressure.

In an embodiment, in order to avoid confusion, modulations of adjacent periods of the plurality of time periods are not the same. In other words, in this embodiment, modulations of non-adjacent periods of the plurality of time periods can be the same.

The present invention provides a control method of a stylus for providing a tilt angle and an axial direction, wherein the stylus includes a first electrode at a tip of the stylus; a second electrode surrounding the first electrode; a first button, the control method including: reading the status of the first button; and instructing the first electrode and the second electrode to perform one of a plurality of modulations in each of a plurality of time periods based on the status of the first button, wherein the plurality of modulations include the following three types: instructing the first electrode to emit an electrical signal; instructing the second electrode to emit an electrical signal; and instructing both the first and the second electrodes to emit electrical signals simultaneously.

In an embodiment, in order to facilitate synchronization with a touch control apparatus of a touch screen, the stylus further includes a detection circuit connected to the control module for detecting a beacon signal, wherein the control method further includes: after the detection circuit detects a beacon signal, instructing the first electrode and the second electrode to perform one of the plurality of modulations in each of the plurality of time periods based on the status of the first button.

In this embodiment, the beacon signal is emitted by touch sensitive electrodes on the touch screen, in order for the beacon signal received to have a better SNR, the detection circuit detects the beacon signal via the first electrode. In this embodiment, a plurality of first touch sensitive electrodes on the touch screen can sequentially emit the beacon signal, or a driving signal. At the same time with or a different time from when mutual capacitive detection is carried out, the stylus is driven to enter into the plurality of time periods. Accordingly, a plurality of second touch sensitive electrodes on the touch screen can detect the electrical signals of the plurality of time periods. Based on the location of the first touch sensitive electrode that emitted the beacon signal, and the electrical signals detected by the plurality of second touch sensitive electrodes, the image 350 of FIG. 3(b) is formed.

In an embodiment, in order to increase the types of the modulation sequence so as to represent more statues of the same stylus, or to represent the statues of a plurality of stylus at the same time, the plurality of modulations further include: instructing the first electrode and the second electrode to not emit electrical signals simultaneously.

In an embodiment, the stylus further includes a second button connected to the control module, wherein the control method further includes instructing the first electrode and the second electrode to perform one of the plurality of modulations in each of the plurality of time periods based on the statues of the first button and the second button.

In an embodiment, for design convenience in the stylus and the touch control apparatus, the electrical signals emitted in the plurality of time periods are all the same.

In an embodiment, in order to represent the pressure experienced by the first electrode, the electrical signal includes signals having a plurality of frequencies, the pressure experienced by the first electrode is a ratio of signal strengths of the plurality of frequencies. In this embodiment, in order to represent the state of suspension in which the stylus may be in, when the ratio is within a certain range, the first electrode is not under pressure.

In an embodiment, in order to avoid confusion, modulations of adjacent periods of the plurality of time periods are not the same. In other words, in this embodiment, modulations of non-adjacent periods of the plurality of time periods can be the same.

Figure 23:
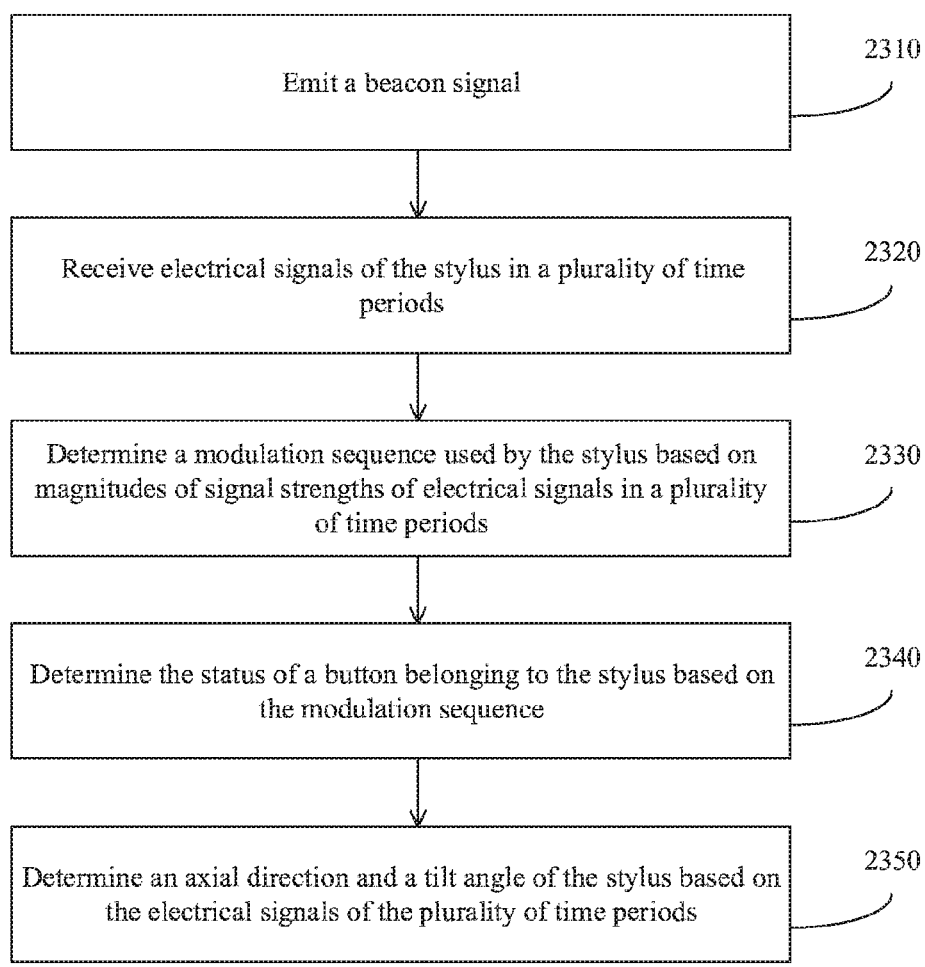
FIG. 23 is a flowchart illustrating a processing method of a touch control apparatus in accordance with an embodiment of the present invention.

In order to detect the stylus 1900 shown in FIGS. 19 and 22, the touch sensitive system 1300 of FIG. 13 can be used. However, the processing module 1323 of the touch sensitive system 1300 needs to use the processing method shown in FIG. 23. Referring to FIG. 23, a flowchart illustrating a processing method of a touch control apparatus in accordance with an embodiment of the present invention is shown. The method includes, but is not limited to, the following steps. An optional step 2310 includes instructing the first touch sensitive electrodes 1311 to sequentially emit a beacon signal or instructing all of the first touch sensitive electrodes 1311 and/or all of the second touch sensitive electrodes 1312 to emit a beacon signal. After the beacon signal is received, the stylus emits one of a plurality of modulations in a plurality of time periods. Step 2320 includes receiving electrical signals of the stylus in the plurality of time periods. If in step 2310, the first touch sensitive electrodes 1311 sequentially emits a beacon signal, then in step 2320, a plurality of images are constructed from sensing results obtained in the plurality of time periods by the plurality of second touch sensitive electrodes 1312 of the sensing circuit 1322, each image corresponds to each of the plurality of time periods. If in step 2310, all of the first touch sensitive electrodes 1311 and/or all of the second touch sensitive electrodes 1312 emit a beacon signal. first-axis 1D sensing information of the plurality of time periods can be obtained by the sensing circuit 1322 from all of the first touch sensitive electrodes 1311, and second-axis 1D sensing information of the plurality of time periods can also be obtained by the sensing circuit 1322 from all of the second touch sensitive electrodes 1312. Step 2330 includes determining a modulation sequence used by the stylus based on magnitudes of signal strengths of electrical signals in a plurality of time periods corresponding to one or more touch sensitive electrode(s). In the case of a plurality of stylus, modulation sequences used by different stylus can be determined based on magnitudes of signal strengths of electrical signals in a plurality of time periods corresponding to different touch sensitive electrodes. Step 2340 includes determining the status of a button belonging to the stylus based on the obtained modulation sequence. Step 2350 includes determining an axial direction and a tilt angle of the stylus based on the electrical signals of the plurality of time periods. This step can be performed in accordance with the embodiments described with respect to FIGS. 3 and 4, in which a first electrode projection area and a second electrode projection area are determined based on the image, and the location of the tip, the axial direction and the tilt angle of the stylus can then be determined. Alternatively, the location of the tip, the axial direction and the tilt angle of the stylus can be determined based on the first-axis and the second-axis 1D sensing information of the plurality of time periods.

The present invention provides a touch control apparatus for detecting a tilt angle and an axial direction of a stylus, wherein the stylus includes a first electrode at a tip of the stylus; a second electrode surrounding the first electrode; and a first button; the touch control apparatus including: a sensing circuit connected to a touch screen, wherein the touch screen includes a plurality of first touch sensitive electrodes and a plurality of second touch sensitive electrodes, the plurality of first touch sensitive electrodes and the plurality of second touch sensitive electrodes forming a plurality of sensing points; a signal strength detecting circuit; and a processing module connected to the sensing circuit and the signal strength detection circuit, the processing module being configured for: instructing the sensing circuit to receive electrical signals emitted by the stylus in a plurality of time periods; instructing the signal strength detecting circuit to calculate signal strengths of electrical signals in the plurality of time periods to determine a modulation sequence used by the stylus, wherein the modulation sequence includes a plurality of modulations, each of the time periods uses one type of the plurality of modulations; determining the status of the first button based on the modulation sequence; and determining a tilt angle and an axial direction of the stylus based on the electrical signals of the plurality of time periods, wherein the plurality of modulations include the following three types: instructing the first electrode to emit an electrical signal; instructing the second electrode to emit an electrical signal; and instructing both the first and the second electrodes to emit electrical signals simultaneously.

In an embodiment, in order to facilitate synchronization between the stylus and the touch control apparatus of the touch screen, the touch control apparatus further includes a driving circuit connected to the processing module, the processing module further includes instructing the driving circuit to sequentially emit a beacon signal via each of the first touch sensitive electrodes; instructing the sensing circuit to receive electrical signals emitted by the stylus in the plurality of time periods after each of the first touch sensitive electrodes emits the beacon signal; and constructing an image corresponding to a respective time period based on the electrical signal received in each of the time periods.

In an embodiment, in order to facilitate synchronization between the stylus and the touch control apparatus of the touch screen, the touch control apparatus further includes a driving circuit connected to the processing module, the processing module further includes instructing the driving circuit to emit a beacon signal via all of the first touch sensitive electrodes and/or all of the second touch sensitive signals; and instructing the sensing circuit to receive electrical signals emitted by the stylus via all of the first touch sensitive electrodes and all of the second touch sensitive signals to form first-axis 1D sensing information and second-axis 1D sensing information of the plurality of time periods.

In an embodiment, in order to increase the types of the modulation sequence so as to represent more statues of the same stylus, or to represent the statues of a plurality of stylus at the same time, the plurality of modulations further include: instructing the first electrode and the second electrode to not emit electrical signals simultaneously.

In an embodiment, for design convenience in the stylus and the touch control apparatus, the electrical signals emitted in the plurality of time periods are all the same.

In an embodiment, in order to represent the pressure experienced by the first electrode, the electrical signal includes signals having a plurality of frequencies, the pressure experienced by the first electrode is a ratio of signal strengths of the plurality of frequencies. In this embodiment, the signal strength detecting circuit further includes calculating signal strengths of the plurality of frequencies included in the electrical signal, the processing module further includes calculating a ratio of signal strengths of the plurality of frequencies to determine the pressure experienced by the first electrode of the stylus. In this embodiment, in order to represent the state of suspension in which the stylus may be in, when the ratio is within a certain range, the first electrode is not under pressure.

In an embodiment, in order to avoid confusion, modulations of adjacent periods of the plurality of time periods are not the same. In other words, in this embodiment, modulations of non-adjacent periods of the plurality of time periods can be the same.

The present invention provides a control method of a stylus for providing a tilt angle and an axial direction, wherein the stylus includes a first electrode at a tip of the stylus; a second electrode surrounding the first electrode; a first button, the control method including: instructing a sensing circuit to receive via a touch screen electrical signals emitted by the stylus in a plurality of time periods; instructing a signal strength detecting circuit to calculate signal strengths of the electrical signals in the plurality of time periods to determine a modulation sequence used by the stylus, wherein the modulation sequence includes a plurality of modulations, each of the time periods uses one type of the plurality of modulations; determining the status of the first button based on the modulation sequence; and determining a tilt angle and an axial direction of the stylus based on the electrical signals of the plurality of time periods, wherein the plurality of modulations include the following three types: instructing the first electrode to emit an electrical signal; instructing the second electrode to emit an electrical signal; and instructing both the first and the second electrodes to emit electrical signals simultaneously.

In an embodiment, in order to facilitate synchronization between the stylus and a touch control apparatus of the touch screen, the control method further includes instructing a driving circuit to sequentially emit a beacon signal via each of first touch sensitive electrodes of the touch screen; instructing the sensing circuit to receive electrical signals emitted by the stylus in the plurality of time periods after each of the first touch sensitive electrodes emits the beacon signal; and constructing an image corresponding to a respective time period based on the electrical signal received in each of the time periods.

In an embodiment, in order to facilitate synchronization between the stylus and the touch control apparatus of the touch screen, the control method further includes instructing a driving circuit to emit a beacon signal via all of the first touch sensitive electrodes and/or all of the second touch sensitive signals; and instructing the sensing circuit to receive electrical signals emitted by the stylus via all of the first touch sensitive electrodes and all of the second touch sensitive signals in the plurality of time periods after the beacon signal is emitted to form first-axis 1D sensing information and second-axis 1D sensing information of the plurality of time periods.

In an embodiment, in order to increase the types of the modulation sequence so as to represent more statues of the same stylus, or to represent the statues of a plurality of stylus at the same time, the plurality of modulations further include: instructing the first electrode and the second electrode to not emit electrical signals simultaneously.

In an embodiment, for design convenience in the stylus and the touch control apparatus, the electrical signals emitted in the plurality of time periods are all the same.

In an embodiment, in order to represent the pressure experienced by the first electrode, the electrical signal includes signals having a plurality of frequencies, the pressure experienced by the first electrode is a ratio of signal strengths of the plurality of frequencies. In this embodiment, the control method further includes calculating signal strengths of the plurality of frequencies included in the electrical signal; and calculating a ratio of signal strengths of the plurality of frequencies to determine the pressure experienced by the first electrode of the stylus. In this embodiment, in order to represent the state of suspension in which the stylus may be in, when the ratio is within a certain range, the first electrode is not under pressure.

In an embodiment, in order to avoid confusion, modulations of adjacent periods of the plurality of time periods are not the same. In other words, in this embodiment, modulations of non-adjacent periods of the plurality of time periods can be the same.

The present invention provides a touch sensitive system for detecting a tilt angle and an axial direction of a stylus, which includes: the stylus; a touch screen; and a touch control apparatus connected with the touch screen. The stylus includes a first electrode at a tip of the stylus; a second electrode surrounding the first electrode; and a first button. The touch screen includes a plurality of first touch sensitive electrodes and a plurality of second touch sensitive electrodes, the plurality of first touch sensitive electrodes and the plurality of second touch sensitive electrodes forming a plurality of sensing points. The touch control apparatus includes: a sensing circuit connected with the touch screen; a signal strength detecting circuit; and a processing module connected to the sensing circuit and the signal strength detection circuit, the processing module being configured for: instructing the sensing circuit to receive electrical signals emitted by the stylus in a plurality of time periods; instructing the signal strength detecting circuit to calculate signal strengths of electrical signals in the plurality of time periods to determine a modulation sequence used by the stylus, wherein the modulation sequence includes a plurality of modulations, each of the time periods uses one type of the plurality of modulations; determining the status of the first button based on the modulation sequence; and determining a tilt angle and an axial direction of the stylus based on the electrical signals of the plurality of time periods, wherein the plurality of modulations include the following three types: instructing the first electrode to emit an electrical signal; instructing the second electrode to emit an electrical signal; and instructing both the first and the second electrodes to emit electrical signals simultaneously.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A touch control apparatus for detecting a tilt angle and an axial direction of a stylus, wherein the stylus includes a first electrode at a tip of the stylus, a second electrode surrounding the first electrode, and a first button; the touch control apparatus comprising:
a sensing circuit connected to a touch screen, wherein the touch screen includes a plurality of first touch sensitive electrodes and a plurality of second touch sensitive electrodes, the plurality of first touch sensitive electrodes and the plurality of second touch sensitive electrodes forming a plurality of sensing points;
a signal strength detecting circuit; and
a processing module connected to the sensing circuit and the signal strength detection circuit, the processing module being configured for:
instructing the sensing circuit to receive electrical signals emitted by the stylus in at least three consecutive time periods;
instructing the signal strength detecting circuit to calculate magnitudes of signal strengths of the electrical signals in the plurality of time periods to determine a modulation sequence used by the stylus, wherein the modulation sequence includes a plurality of modulations;
determining the status of the first button based on the modulation sequence; and
determining the tilt angle and the axial direction of the stylus based on the electrical signals of the plurality of time periods;
wherein the plurality of modulations include the following three types: instructing the first electrode to emit an electrical signal; instructing the second electrode to emit an electrical signal; and instructing both the first and the second electrodes to emit electrical signals simultaneously; and
wherein the at least three consecutive time periods use all three types of modulations, and each one of the at least three consecutive time periods uses one of the three types of modulations.

2. The touch control apparatus of claim 1, further comprising a driving circuit connected to the processing module, wherein the processing module further includes instructing the driving circuit to sequentially emit a beacon signal via each of the first touch sensitive electrodes; instructing the sensing circuit to receive the electrical signals emitted by the stylus in the plurality of time periods after each of the first touch sensitive electrodes emits the beacon signal; and constructing an image corresponding to a respective time period based on the electrical signal received in each of the time periods.

3. The touch control apparatus of claim 1, further comprising a driving circuit connected to the processing module, wherein the processing module further includes instructing the driving circuit to emit a beacon signal via all of the first touch sensitive electrodes and/or all of the second touch sensitive signals; and after each of first touch sensitive electrodes emits the beacon signal, instructing the sensing circuit to receive the electrical signals emitted by the stylus via all of the first touch sensitive electrodes and all of the second touch sensitive signals in the plurality of time periods to form first-axis one-dimensional (1D) sensing information and second-axis 1D sensing information of the plurality of time periods, respectively.

4. The touch control apparatus of claim 1, wherein the plurality of modulations further includes: instructing the first electrode and the second electrode to not emit electrical signals simultaneously.

5. The touch control apparatus of claim 1, wherein the electrical signals emitted in the plurality of time periods are all the same.

6. The touch control apparatus of claim 1, wherein the electrical signal includes signals having a plurality of frequencies, the pressure experienced by the first electrode is a ratio of signal strengths of the plurality of frequencies, the signal strength detecting circuit further includes calculating signal strengths of the plurality of frequencies included in the electrical signal, the processing module further calculates a ratio of signal strengths of the plurality of frequencies to determine the pressure experienced by the first electrode of the stylus.

7. The touch control apparatus of claim 6, wherein when the ratio is within a certain range, the first electrode is not under pressure.

8. The touch control apparatus of claim 1, wherein modulations of adjacent time periods in the plurality of time periods are not the same.

9. The touch control apparatus of claim 1, wherein modulations of non-adjacent time periods in the plurality of time periods are the same.

10. A control method for providing a tilt angle and an axial direction of a stylus, wherein the stylus includes a first electrode at a tip of the stylus, a second electrode surrounding the first electrode and a first button, the control method comprising:
instructing a sensing circuit to receive via a touch screen electrical signals emitted by the stylus in at least three consecutive time periods;
instructing a signal strength detecting circuit to calculate magnitudes of signal strengths of the electrical signals in the plurality of time periods to determine a modulation sequence used by the stylus, wherein the modulation sequence includes a plurality of modulations;
determining the status of the first button based on the modulation sequence; and determining the tilt angle and the axial direction of the stylus based on the electrical signals of the plurality of time periods;

wherein the plurality of modulations include the following three types: instructing the first electrode to emit an electrical signal; instructing the second electrode to emit an electrical signal; and instructing both the first and the second electrodes to emit electrical signals simultaneously; and wherein the at least three consecutive time periods use all three types of modulations, and each one of the at least three consecutive time periods uses one of the three types of modulations.

11. The control method of claim 10, further comprising:
instructing a driving circuit to sequentially emit a beacon signal via each of first touch sensitive electrodes of the touch screen;
instructing the sensing circuit to receive the electrical signals emitted by the stylus in the plurality of time periods after each of the first touch sensitive electrodes emits the beacon signal; and
constructing an image corresponding to a respective time period based on the electrical signal received in each of the time periods.

12. The control method of claim 10, further comprising:
instructing a driving circuit to emit a beacon signal via all of the first touch sensitive electrodes and/or all of the second touch sensitive signals; and
instructing the sensing circuit to receive the electrical signals emitted by the stylus via all of the first touch sensitive electrodes and all of the second touch sensitive signals in the plurality of time periods after the beacon signal is emitted to form first-axis one-dimensional (1D) sensing information and second-axis 1D sensing information of the plurality of time periods.

13. The control method of claim 10, wherein the plurality of modulations further include: instructing the first electrode and the second electrode to not emit electrical signals simultaneously.

14. The control method of claim 10, wherein the electrical signals emitted by the stylus in the plurality of time periods are all the same.

15. The control method of claim 10, wherein the electrical signal includes signals having a plurality of frequencies, the pressure experienced by the first electrode is a ratio of signal strengths of the plurality of frequencies, the control method further comprising:
calculating signal strengths of the plurality of frequencies included in the electrical signal; and
calculating a ratio of signal strengths of the plurality of frequencies to determine the pressure experienced by the first electrode of the stylus.

16. The control method of claim 15, wherein when the ratio is within a certain range, the first electrode is not under pressure.

17. The control method of claim 10, wherein modulations of adjacent time periods in the plurality of time periods are not the same.

18. The control method of claim 10, wherein modulations of non-adjacent time periods in the plurality of time periods are the same.

19. A touch sensitive system for detecting a tilt angle and an axial direction of a stylus, comprising:
the stylus including:
a first electrode at a tip of the stylus;
a second electrode surrounding the first electrode; and
a first button;
a touch screen including a plurality of first touch sensitive electrodes and a plurality of second touch sensitive electrodes, the plurality of first touch sensitive electrodes and the plurality of second touch sensitive electrodes forming a plurality of sensing points; and
a touch control apparatus connected with the touch screen including:
a sensing circuit connected with the touch screen;
a signal strength detecting circuit; and
a processing module connected to the sensing circuit and the signal strength detection circuit, the processing module being configured for:
instructing the sensing circuit to receive electrical signals emitted by the stylus in at least three consecutive time periods;
instructing the signal strength detecting circuit to calculate magnitudes of signal strengths of the electrical signals in the plurality of time periods to determine a modulation sequence used by the stylus, wherein the modulation sequence includes a plurality of modulations;
determining the status of the first button based on the modulation sequence; and
determining the tilt angle and the axial direction of the stylus based on the electrical signals of the plurality of time periods;
wherein the plurality of modulations include the following three types: instructing the first electrode to emit an electrical signal; instructing the second electrode to emit an electrical signal; and instructing both the first and the second electrodes to emit electrical signals simultaneously; and
wherein the at least three consecutive time periods use all three types of modulations, and each one of the at least three consecutive time periods uses one of the three types of modulations.

* * * * *